(12) United States Patent
Arai

(10) Patent No.: US 7,224,652 B2
(45) Date of Patent: May 29, 2007

(54) OPTICAL DISC APPARATUS, INFORMATION RECORDING METHOD, ADJUSTMENT APPARATUS, ADJUSTMENT METHOD AND FABRICATION METHOD FOR OPTICAL DISC APPARATUS, AND METHOD AND APPARATUS FOR ADJUSTING PHASE SHIFT AMOUNT

(75) Inventor: Kuniaki Arai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 346 days.

(21) Appl. No.: 10/929,747

(22) Filed: Aug. 31, 2004

(65) Prior Publication Data
US 2005/0047297 A1 Mar. 3, 2005

Related U.S. Application Data

(63) Continuation of application No. PCT/JP04/03097, filed on Mar. 10, 2004.

(30) Foreign Application Priority Data

| Aug. 28, 2003 | (JP) | ............................ 2003-304545 |
| Aug. 28, 2003 | (JP) | ............................ 2003-304546 |
| Oct. 29, 2003 | (JP) | ............................ 2003-368475 |
| Oct. 29, 2003 | (JP) | ............................ 2003-368476 |

(51) Int. Cl.
*G11B 7/00* (2006.01)
(52) U.S. Cl. .................. 369/47.28; 369/124.14
(58) Field of Classification Search .............. 369/47.1, 369/47.28, 47.27, 275.3, 44.13, 124.14
See application file for complete search history.

(56) References Cited

U.S. PATENT DOCUMENTS

| 6,125,089 A | 9/2000 | Shigemori |
| 7,057,985 B1 * | 6/2006 | Kobayashi et al. ...... 369/47.28 |
| 2003/0002406 A1 | 1/2003 | Hironori et al. |

FOREIGN PATENT DOCUMENTS

| JP | 10-283658 | 10/1998 |
| JP | 2000-173055 | 6/2000 |
| JP | 2000-195190 | 7/2000 |
| JP | 2001-52446 | 2/2001 |
| JP | 2001-126413 | 5/2001 |
| JP | 2002-56626 | 2/2002 |
| JP | 2002-208141 | 7/2002 |
| JP | 2002-319134 | 10/2002 |
| JP | 2003-30841 | 1/2003 |
| JP | 2003-100015 | 4/2003 |
| JP | 2003-317388 | 11/2003 |

\* cited by examiner

*Primary Examiner*—Nabil Hindi
(74) *Attorney, Agent, or Firm*—Dickstein Shapiro LLP

(57) ABSTRACT

The present invention relates to an optical disc apparatus having a wobble signal detection circuit, an information recording method, adjustment apparatus and method for an optical disc apparatus, a fabrication method for an optical disc apparatus, and adjustment method and apparatus for a phase shift amount. In the present invention, a wobble signal based on wobbling of an information track is supplied to the input side of a filter circuit, and the current phase difference between input and output signals to/from an HPF+LPF path is detected. Then, the phase of a recording start timing signal is adjusted corresponding to the detected phase difference. As a result, it is possible to prevent adverse effect due to the phase difference in the filter circuit.

46 Claims, 22 Drawing Sheets

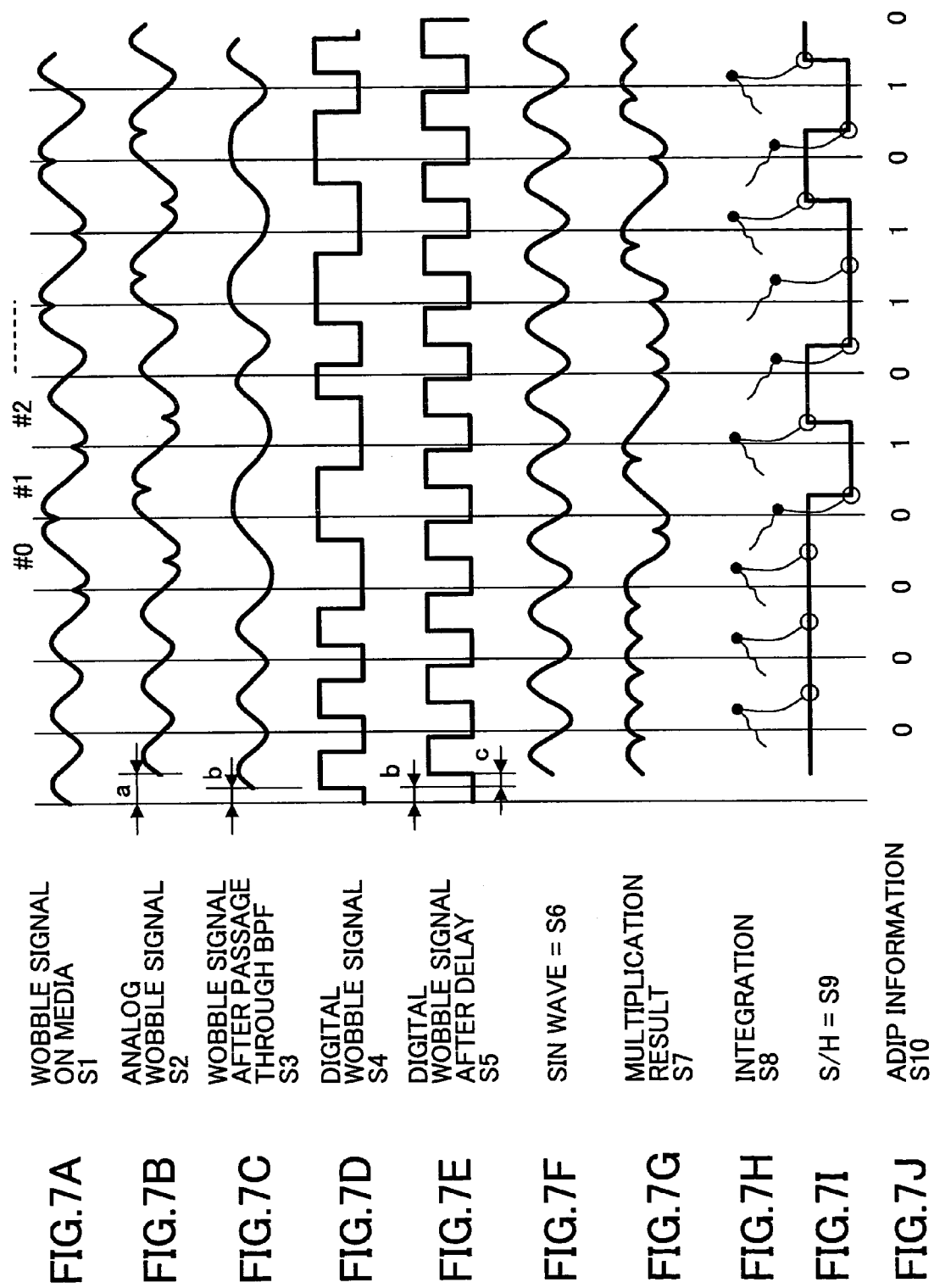

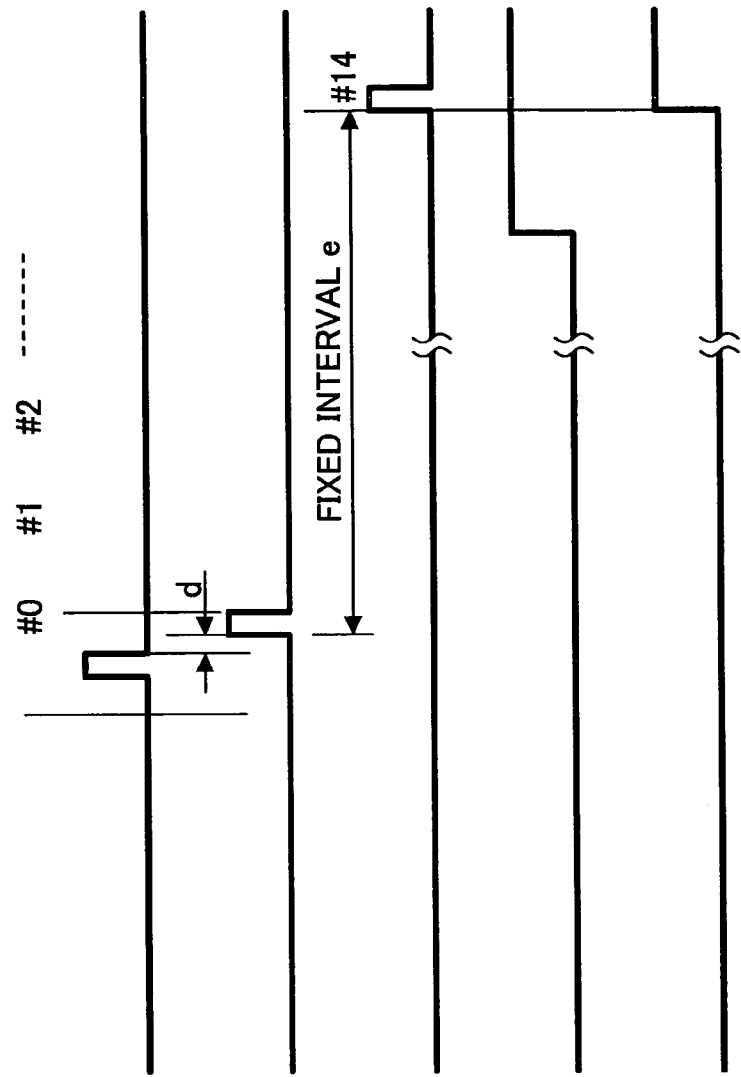

FIG.13A  WOBBLE SIGNAL ON MEDIA S1

FIG.13B  ANALOG WOBBLE SIGNAL S2

FIG.13C  WOBBLE SIGNAL AFTER PASSAGE THROUGH BPF S3

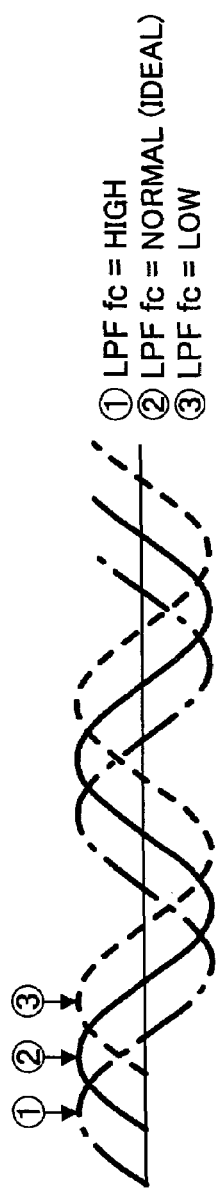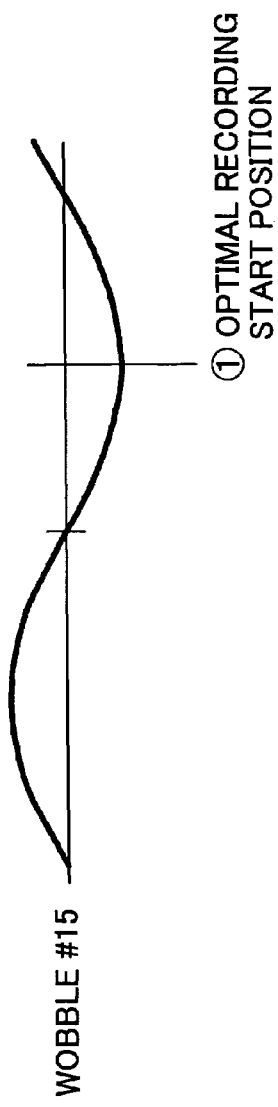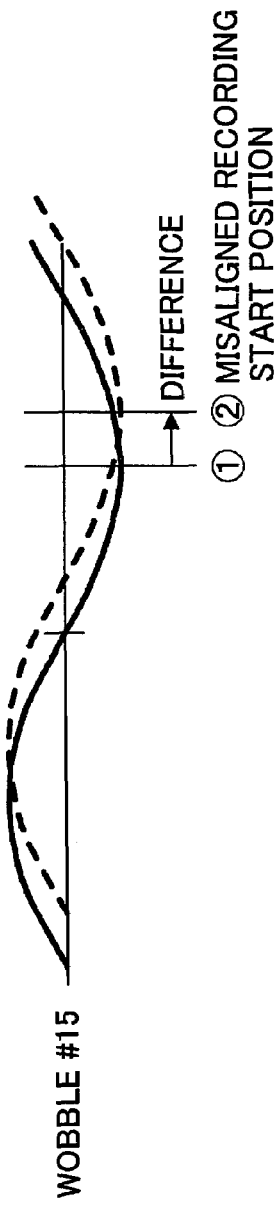
FIG.21
FIG.22A
FIG.22B

RF SIGNAL 14T PORTION AFTER SUCCESSIVE WRITING BY ONE ECC

14T PORTION AFTER SUCCESSIVE WRITING BY ONE ECC

OPTICAL DISC APPARATUS, INFORMATION RECORDING METHOD, ADJUSTMENT APPARATUS, ADJUSTMENT METHOD AND FABRICATION METHOD FOR OPTICAL DISC APPARATUS, AND METHOD AND APPARATUS FOR ADJUSTING PHASE SHIFT AMOUNT

CROSS-REFERENCE TO RELATED APPLICATION

This application is a U.S. continuation application filed under 35 USC 111(a) claiming benefit under 35 USC 120 and 365(c) of PCT application JP2004/003097 filed Mar. 10, 2004, which claims priority to Applications No. 2003-304545 filed in Japan on Aug. 28, 2003, No. 2003-304546 filed in Japan on Aug. 28, 2003, No. 2003-368475 filed in Japan on Oct. 29, 2003, and No. 2003-368476 filed in Japan on Oct. 29, 2003. The foregoing applications are hereby incorporated herein by reference.

BACKGROUND OF THE INVENTION

1. Field of the Invention

The present invention relates to an optical disc apparatus having a wobble signal detection circuit, an information recording method, apparatus and method of adjusting an optical disc apparatus, a method of fabricating an optical disc apparatus, and apparatus and method of adjusting a phase shift amount.

2. Description of the Related Art

For optical discs including DVD+R and DVD+RW, an optical disc having an information track wobbled at a constant time period, the information track being spirally formed on an optical disc substrate in advance in a manner of phase shift keying, is used.

In a light receiving element receiving light reflected from such an optical disc including DVD+R and DVD+RW, for example, in a wobble signal detection circuit used to generate ADIP (Address In Pre-groove) information or the like by detecting and generating a wobble signal based on a received light signal of a four-divided light receiving element, a circuit as illustrated in FIG. 20 is used. For the illustrated wobble signal detection circuit, only a first half portion, that is, a portion used until a digital wobble signal and an analog wobble signal are generated based on voltage signals VA through VD obtained from respective light receiving element areas of a four-divided light receiving element is illustrated.

First, the individual voltage signals VA through VD are sample-held by respective sample-hold circuit (S/H) 100, and after adders 101 add VA and VB to VC and VD, respectively, multipliers 102 reduce the results to half, that is, the respective multipliers 102 compute 0.5(VA+VC) and 0.5(VB+VD). Then, a balance AGC circuit 103 balances amplitudes between 0.5(VA+VC) and 0.5(VB+VD), and a subtracter 104 computes 0.5(VA+VC)−0.5(VB+VD) and supplies the computation result to a filter circuit 105. The filter circuit 105 includes a BPF path for digital wobble signals provided by a band-pass filter (BPF) 106 and an HPF+LPF path for analog wobble signals provided by a high-pass filter (HPF) 107 and a low-pass filter (LPF) 108. A digitizer 109, for example, using a comparator, is provided at an output side of BPF 106.

Here, a difference of a cutoff frequency fc in LPF 108 of the HPF+LPF path becomes problematic. It is hard to make the cutoff frequency fc in LPF 108 accurate, and in particular, the difference between circuits is noticeable in mass production. If this cutoff frequency fc is not uniform, as illustrated in FIG. 21, the phase of the analog wobble signal also deviates from an ideal phase (solid line) depending on high and low levels. When information is recorded on an optical disc such as DVD+RW, the recording start position is set on the basis of an analog wobble signal. Thus, if the phase of the analog wobble signal deviates, the recording start position is also misplaced from the optimal position, as illustrated in FIG. 22(b).

In order to overcome this problem, for example, according to Patent Reference 1 (Japanese Laid-Open Patent Application No. 2000-173055), a method is presented. In the method, when information is overwritten on an already recorded disc, data reproduced from the recorded portion thereof are used as a reference signal for a clock generator. Also, in a newly information-recorded area, the clock phase is adapted by switching into a clock generation signal recorded in the recorded portion in advance, and the recording start position is set to the optimal value.

Apart from the method in Patent Reference 1, there is a method of adjusting the recording start position to the optimal recording position by using a disc whose 14T sync frame part is provided with a 6T mirror part (portion where lighting is impossible and the reflection rate is high). In this adjustment method, each one ECC (one record block of DVD) is recorded on a mirror disc, and after the recording, the disc is read to observe RF signal waveform (see FIG. 23). Then, the optimal recording position is determined based on a phase difference between the center of the 14T portion of the RF signal and the center of the mirror portion (if the 14T center matches the mirror portion center, the recording start position is optimal). After that, the recording start position is adjusted by setting a recording start position setup parameter (which is referred to as timeset hereinafter, see FIG. 24) P1, P2 or P3 corresponding to the phase difference. Thus, even if the wobble signal is phase lagged, it is possible to adjust the recording start position to the optimal recording position through adjustment of timeset.

However, Patent Reference 1 is applicable to only an optical disc having a recorded portion. Also, although Patent Reference 1 can be successfully applied to an optical disc having a recorded portion where the recording has been conducted at a correct recording start position, the method of Patent Reference 1 can start recording from an incorrect recording start position for an optical disc having a recorded portion where the recording has not been conducted at a correct recording position.

Also, in the latter case, since the adjustment method requires to use a special disc, the cost becomes higher. Additionally, since information must be actually recorded in a disc and then be actually reproduced from the disc to check the status of an RF signal, it takes longer time to adjust the recording start position.

Additionally, in terms of the interior of a filter circuit, for example, if the phase relation between an analog wobble signal and a digital wobble signal is not uniform due to the nonuniformity of the cutoff frequency fc of LPF, reasonable ADIP information cannot be obtained because of failure of multiplication. As a result, address information and synchronization signals may be adversely affected.

SUMMARY OF THE INVENTION

It is a general object of the present invention to provide an optical disc apparatus having a wobble signal detection circuit, an information recording method, apparatus and method for adjusting an optical disc apparatus, a method of fabricating an optical disc apparatus, and method and apparatus for adjusting a phase shift amount in which the above-mentioned problems on the prior art are eliminated.

A more specific object of the present invention is to provide an optical disc apparatus and an information recording method that can automatically prevent adverse effect due to phase differences in a filter circuit without any operation of an adjustment step or the like in advance.

Another more specific object of the present invention is to provide apparatus and method for adjusting an optical disc apparatus in which cost and time can be made relatively smaller and adverse effect due to phase difference in a filter circuit can be prevented.

More particularly, the object of the present invention is to provide an optical disc apparatus having a wobble signal detection circuit, an information recording method, apparatus and method for adjusting an optical disc apparatus, a method of fabricating an optical disc apparatus, and method and apparatus for adjusting a phase shift amount in which a recording start position can be adjusted to the optimal position or ADIP information can be demodulated under the optimal status without any effect due to phase differences in a filter circuit.

In order to achieve the above-mentioned objects, an optical disc apparatus may be provided for recording information by illuminating light to an information recording medium having an information track wobbled at a constant period wherein the optical disc apparatus includes a wobble signal detection circuit having a filter circuit, and the wobble signal detection circuit detects a wobble signal based on wobbling of the information track and demodulates ADIP information, the apparatus including: a phase difference detection part detecting a phase difference between input and output signals to/from the filter circuit to which the wobble signal is supplied; and an adjustment part adjusting a phase of a recording start timing signal synchronized with a synchronization signal included in the ADIP information corresponding to the detected phase difference.

According to another aspect of the invention, the optical disc apparatus further includes: an amplitude ratio detection part detecting an amplitude ratio between the input and output signals to/from the filter circuit to which the wobble signal is supplied, wherein the phase difference detection part detects the phase difference between the input and output signals to/from the filter circuit based on the detected amplitude ratio.

According to another aspect of the invention, the adjustment part adjusts the phase of the recording start timing signal by delaying a phase of the synchronization signal corresponding to the detected phase difference.

According to another aspect of the invention, the filter circuit comprises a first path via which the wobble signal passes through a band pass filter and a second path via which the wobble signal passes through a high pass filter and a low pass filter, and the phase difference detection part detects a phase difference between input and output signals to/from the second path.

According to another aspect of the invention, the filter circuit comprises a first path via which the wobble signal passes through a band pass filter and a second path via which the wobble signal passes through a high pass filter and a low pass filter, and the phase difference detection part detects a phase difference between input and output signals to/from the first path.

The invention also relates to an optical disc apparatus for recording information by illuminating light to an information recording medium having an information track wobbled at a constant period wherein the optical disc apparatus includes a wobble signal detection circuit having a filter circuit, and the wobble signal detection circuit detects a wobble signal based on wobbling of the information track and demodulates ADIP information, the apparatus including: a first path via which the wobble signal passes through a band pass filter; a second path via which the wobble signal passes through a high pass filter and a low pass filter; a phase difference detection part detecting a phase difference between input and output signals to/from the first path to which the wobble signal is supplied and a phase difference between input and output signals to/from the second path to which the wobble signal is supplied; and an adjustment part performing phase adjustment corresponding to the detected phase differences such that a phase of the first path matches a phase of the second path.

According to another aspect of the invention, optical disc apparatus further includes: an amplitude ratio detection part detecting an amplitude ratio between input and output signals to/from the first path to which the wobble signal is supplied and an amplitude ratio between input and output signals to/from the second path to which the wobble signal is supplied, wherein the phase difference detection part detects the respective phase differences between the input and output signals based on the detected amplitude ratios.

According to another aspect of the invention, the phase difference detection part executes a detection operation for each constant timing.

According to another aspect of the invention, the phase difference detection part executes a detection operation in transition from a reproduction operation to a recording operation in CAV.

The invention also relates of an information recording method of recording information in an information recording medium by using an optical disc apparatus having a wobble signal detection circuit with a filter circuit, said wobble signal detection circuit illuminating light to the information recording medium having an information track wobbled at a constant period, detecting a wobble signal based on wobbling of the wobbled information track, and demodulating ADIP information, the method including: a signal input step of obtaining the wobble signal based on the wobbling of the information track of the information recording medium and supplying the obtained wobble signal to the filter circuit; a phase difference detection step of detecting a phase difference between input and output signals to/from the filter circuit to which the wobble signal is supplied; and an adjustment step of adjusting a phase of a recording start timing signal synchronized with a synchronization signal included in the ADIP information corresponding to the detected phase difference.

According to another aspect of the invention, the information recording method further includes: an amplitude ratio detection step of detecting an amplitude ratio between the input and output signals to/from the filter circuit to which the wobble signal is supplied, wherein the phase difference detection step comprises detecting the phase difference between the input and output signals to/from the filter circuit based on the detected amplitude ratio.

According to another aspect of the invention, the adjustment step comprises adjusting the phase of the recording start timing signal by delaying a phase of the synchronization signal corresponding to the detected phase difference.

According to another aspect of the invention, wherein by using the filter circuit comprising a first path via which the wobble signal passes through a band pass filter and a second path via which the wobble signal passes through a high pass filter and a low pass filter, the phase difference detection step detects a phase difference between input and output signals to/from the second path.

According to another aspect of the invention, wherein by using the filter circuit comprising a first path via which the wobble signal passes through a band pass filter and a second path via which the wobble signal passes through a high pass filter and a low pass filter, the phase difference detection step detects a phase difference between input and output signals to/from the first path.

The invention also relates to an information recording method of recording information in an information recording medium by using an optical disc apparatus having a wobble signal detection circuit with a filter circuit, said wobble signal detection circuit illuminating light to the information recording medium having an information track wobbled at a constant period, detecting a wobble signal based on wobbling of the wobbled information track, and demodulating ADIP information, the method including: by using the filter circuit having a first path via which the wobble signal passes through a band pass filter and a second path via which the wobble signal passes through a high pass filter and a low pass filter, a phase difference detection step of detecting a phase difference between input and output signals to/from the first path to which the wobble signal is supplied and a phase difference between input and output signals to/from the second path to which the wobble signal is supplied; and an adjustment step of performing phase adjustment corresponding to the detected phase differences such that a phase of the first path matches a phase of the second path.

According to another aspect of the invention, the method further includes: an amplitude ratio detection step of detecting an amplitude ratio between the input and output signals to/from the first path to which the wobble signal is supplied and an amplitude ratio between the input and output signals to/from the second path, wherein the phase difference detection step comprises detecting the respective phase differences between the input and output signals based on the detected amplitude ratios.

According to another aspect of the invention, the phase difference detection step comprises executing a detection operation for each constant timing.

According to another aspect of the invention, the phase difference detection step comprises executing a detection operation in transition from a reproduction operation to a recording operation in CAV.

The invention also relates to an optical disc apparatus for recording information in an information recording medium wherein the optical disc apparatus includes an optical pickup illuminating light to the information recording medium having an information track wobbled at a constant period, receiving light reflected from the information recording medium and generating a light receiver signal corresponding to an amount of the received light, a filter circuit removing noise from a wobble signal based on wobbling of the information track from the light receiver signal, a synchronization detector detecting a synchronization signal included in the wobble signal, an encoder determining a recording start timing based on the synchronization signal, and a phase adjustment circuit shifting a phase of the synchronization signal and supplying the resulting synchronization signal to the encoder, the apparatus including: a phase comparison part comparing an output signal from the filter circuit with an input signal to the filter circuit; and a phase shift amount adjustment part adjusting a shift amount of the phase of the synchronization signal shifted by the phase adjustment circuit based on the comparison.

The invention also relates to an optical disc apparatus including an optical pickup illuminating light to an information recording medium having an information track wobbled at a constant period, receiving light reflected from the information recording medium and generating a light receiver signal corresponding to an amount of the received light, a first filter circuit removing noise from a wobble signal based on wobbling of the information track from the light receiver signal, a second filter circuit extracting a frequency component around a fundamental frequency component of the wobble signal based on the wobbling of the information track from the light receiver signal, a multiplier multiplying an output signal from the first filter circuit by an output signal from the second filter circuit, a phase adjustment circuit adjusting a phase difference of the two signals supplied to the multiplier, and an information detection circuit detecting information included in the wobble signal based on an output signal from the multiplier, the apparatus including: a phase difference acquisition part acquiring the phase difference between the output signal from the first filter circuit and the output signal from the second filter circuit; and a phase difference adjustment part adjusting the phase difference between the two signals supplied to the multiplier by the phase adjustment circuit based on the phase difference acquired by the phase difference acquisition part.

According to another aspect of the invention, the phase difference acquisition part comprises: a first phase difference acquisition part acquiring a phase difference between input and output signals to/from the first filter circuit; and a second phase difference acquisition part acquiring a phase difference between input and output signals to/from the second filter circuit.

The invention also relates to an adjustment apparatus for an optical disc apparatus recoding information by illuminating light to an information recoding medium having an information track wobbled at a constant period wherein the optical disc apparatus includes a wobble signal detection circuit having a filter circuit and said wobble signal detection circuit detects a wobble signal based on wobbling of the information track, the apparatus including: an alternative signal input part supplying an alternative signal to the wobble signal to an input side of the filter circuit; a phase difference detection part detecting a phase difference between input and output signals to/from the filter circuit to which the alternative signal is supplied; and an adjustment part adjusting a phase of a recording start timing signal determined based on the wobble signal corresponding to the detected phase difference.

According to another aspect of the invention, the alternative signal input part comprises an oscillator supplying a sin wave having amplitude and frequency equivalent to the wobble signal as an alternative signal, and the phase difference detection part comprises an oscilloscope.

According to another aspect of the invention, the alternative signal input part and the phase difference detection part comprises a gain phase analyzer supplying the alternative signal, while sweeping frequency thereof with a sin wave having an amplitude equivalent to the wobble signal, and detecting the phase difference during the frequency being equivalent to the wobble signal.

According to another aspect of the invention, the adjustment apparatus further includes: an amplitude ratio detection part detecting an amplitude ratio between the input and output signals to/from the filter circuit to which the alternative signal is supplied, wherein the phase difference detection part detects the phase difference between the input and output signals to/from the filter circuit based on the detected amplitude ratio.

According to another aspect of the invention, the adjustment part adjusts the phase of the recording start timing signal by delaying a phase of a synchronization signal generated by the wobble signal detection circuit based on the wobble signal corresponding to the detected phase difference.

According to another aspect of the invention, the filter circuit comprises a first path via which the wobble signal passes through a band pass filter and a second path via which the wobble signal passes through a high pass filter and a low pass filter, and the phase difference detection part detects a phase difference between input and output signals to/from the second path.

According to another aspect of the invention, the filter circuit comprises a first path via which the wobble signal passes through a band pass filter and a second path via which the wobble signal passes through a high pass filter and a low pass filter, and the phase difference detection part detects a phase difference between input and output signals to/from the first path.

According to another aspect of the invention, the filter circuit comprises a first path via which the wobble signal passes through a band pass filter and a second path via which the wobble signal passes through a high pass filter and a low pass filter, the phase difference detection part detects the phase difference between the input and output signals to/from the first path and the phase difference between the input and output signals to/from the second path, and the adjustment part performs phase adjustment such that a phase of the first path matches a phase of the second phase.

The invention also relates to an adjustment method for an optical disc apparatus recoding information by illuminating light to an information recoding medium having an information track wobbled at a constant period wherein the optical disc apparatus includes a wobble signal detection circuit having a filter circuit and said wobble signal detection circuit detects a wobble signal based on wobbling of the information track, the method including: an alternative signal input step of supplying an alternative signal to the wobble signal to an input side of the filter circuit; a phase difference detection step of detecting a phase difference between input and output signals to/from the filter circuit to which the alternative signal is supplied; and an adjustment step of adjusting a phase of a recording start timing signal determined based on the wobble signal corresponding to the detected phase difference.

According to another aspect of the invention, the alternative signal input step uses an oscillator supplying a sin wave having amplitude and frequency equivalent to the wobble signal as an alternative signal, and the phase difference detection step uses an oscilloscope.

According to another aspect of the invention, the alternative signal input step and the phase difference detection step use a gain phase analyzer supplying the alternative signal, while sweeping frequency thereof with a sin wave having an amplitude equivalent to the wobble signal, and detecting the phase difference during the frequency being equivalent to the wobble signal.

According to another aspect of the invention, the adjustment method further includes: an amplitude ratio detection step of detecting an amplitude ratio between the input and output signals to/from the filter circuit to which the alternative signal is supplied, wherein the phase difference detection step comprises detecting the phase difference between the input and output signals to/from the filter circuit based on the detected amplitude ratio.

According to another aspect of the invention, the adjustment step comprises adjusting the phase of the recording start timing signal by delaying a phase of a synchronization signal generated by the wobble signal detection circuit based on the wobble signal corresponding to the detected phase difference.

According to another aspect of the invention, the filter circuit comprises a first path via which the wobble signal passes through a band pass filter and a second path via which the wobble signal passes through a high pass filter and a low pass filter, and the phase difference detection step comprises detecting a phase difference between input and output signals to/from the second path.

According to another aspect of the invention, the filter circuit comprises a first path via which the wobble signal passes through a band pass filter and a second path via which the wobble signal passes through a high pass filter and a low pass filter, and the phase difference detection step comprises detecting a phase difference between input and output signals to/from the first path.

According to another aspect of the invention, the filter circuit comprises a first path via which the wobble signal passes through a band pass filter and a second path via which the wobble signal passes through a high pass filter and a low pass filter, the phase difference detection step comprises detecting the phase difference between the input and output signals to/from the first path and the phase difference between the input and output signals to/from the second path, and the adjustment step comprises performing phase adjustment such that a phase of the first path matches a phase of the second phase.

The invention also relates to a fabrication method for an optical disc apparatus for recording information in an information recording medium wherein the optical disc apparatus includes an optical pickup illuminating light to the information recording medium having an information track wobbled at a constant period, receiving light reflected from the information recording medium and generating a light receiver signal corresponding to an amount of the received light, a filter circuit removing noise from a wobble signal based on wobbling of the information track from the light receiver signal, a synchronization detector detecting a synchronization signal included in the wobble signal, an encoder determining a recording start timing based on the synchronization signal, and a phase adjustment circuit shifting a phase of the synchronization signal and supplying the resulting synchronization signal to the encoder, the method including steps of: supplying to the filter circuit a test signal having the same frequency as a fundamental frequency component of the wobble signal extracted at information recording time; comparing a phase difference between a test signal outgoing from the filter circuit and the test signal supplying to the filter circuit; and adjusting an amount of the phase shift by the phase adjustment circuit based on the comparison.

The invention also relates to a fabrication method for an optical disc apparatus including an optical pickup illuminating light to an information recording medium having an information track wobbled at a constant period, receiving light reflected from the information recording medium and generating a light receiver signal corresponding to an amount of the received light, a first filter circuit removing noise from a wobble signal based on wobbling of the information track from the light receiver signal, a second filter circuit extracting a frequency component around a fundamental frequency component of the wobble signal based on the wobbling of the information track from the light receiver signal, a multiplier multiplying an output signal from the first filter circuit by an output signal from the second filter circuit, a phase adjustment circuit adjusting a phase difference of the two signals supplied to the multiplier, and an information detection circuit detecting information included in the wobble signal based on an output signal from the multiplier, the method including steps of: supplying a test signal having the same frequency as a fundamental frequency component of the wobble signal extracted at information recording time to the first filter circuit and the second filter circuit; acquiring a phase difference between a test signal outgoing from the first filter circuit and a test signal outgoing from the second filter circuit; and adjusting the phase difference between the two signals supplied to the multiplier by the phase adjustment circuit based on the phase difference acquired at the phase difference acquisition step.

According to another aspect of the invention, the phase difference acquisition step comprises: a first phase difference acquisition step of acquiring a phase difference between a test signal outgoing from the first filter circuit and a test signal supplied to the first filter circuit; and a second phase difference acquisition step of acquiring a phase difference between a test signal outgoing from the second filter circuit and a test signal supplied to the second filter circuit.

The invention also relates to a phase shift amount adjustment method of adjusting a phase shift amount for an optical disc apparatus including an optical pickup illuminating light to the information recording medium having an information track wobbled at a constant period, receiving light reflected from the information recording medium and generating a light receiver signal corresponding to an amount of the received light, a filter circuit removing noise from a wobble signal based on wobbling of the information track from the light receiver signal, a synchronization detector detecting a synchronization signal included in the wobble signal, an encoder determining a recording start timing based on the synchronization signal, and a phase adjustment circuit shifting a phase of the synchronization signal and supplying the resulting synchronization signal to the encoder, the method including steps of: supplying to the filter circuit a test signal having the same frequency as a fundamental frequency component of the wobble signal extracted at information recording time; comparing a phase difference between a test signal outgoing from the filter circuit and the test signal supplying to the filter circuit; and adjusting the phase shift amount of the synchronization signal by the phase adjustment circuit based on the comparison.

The invention also relates to a phase shift amount adjustment method of adjusting a phase shift amount for an optical disc apparatus including an optical pickup illuminating light to an information recording medium having an information track wobbled at a constant period, receiving light reflected from the information recording medium and generating a light receiver signal corresponding to an amount of the received light, a first filter circuit removing noise from a wobble signal based on wobbling of the information track from the light receiver signal, a second filter circuit extracting a frequency component around a fundamental frequency component of the wobble signal based on the wobbling of the information track from the light receiver signal, a multiplier multiplying an output signal from the first filter circuit by an output signal from the second filter circuit, a phase adjustment circuit adjusting a phase difference of the two signals supplied to the multiplier, and an information detection circuit detecting information included in the wobble signal based on an output signal from the multiplier, the method including steps of: supplying a test signal having the same frequency as a fundamental frequency component of the wobble signal extracted at information recording time to the first filter circuit and the second filter circuit; acquiring a phase difference between a test signal outgoing from the first filter circuit and a test signal outgoing from the second filter circuit; and adjusting the phase difference between the two signals supplied to the multiplier by the phase adjustment circuit based on the phase difference acquired at the phase difference acquisition step.

According to another aspect of the invention, the phase difference acquisition step comprises: a first phase difference acquisition step of acquiring a phase difference between a test signal outgoing from the first filter circuit and a test signal supplied to the first filter circuit; and a second phase difference acquisition step of acquiring a phase difference between a test signal outgoing from the second filter circuit and a test signal supplied to the second filter circuit.

The invention also relates to a phase shift amount adjustment apparatus for adjusting a phase shift amount for an optical disc apparatus including an optical pickup illuminating light to the information recording medium having an information track wobbled at a constant period, receiving light reflected from the information recording medium and generating a light receiver signal corresponding to an amount of the received light, a filter circuit removing noise from a wobble signal based on wobbling of the information track from the light receiver signal, a synchronization detector detecting a synchronization signal included in the wobble signal, an encoder determining a recording start timing based on the synchronization signal, and a phase adjustment circuit shifting a phase of the synchronization signal and supplying the resulting synchronization signal to the encoder, the apparatus including: an input part supplying to the filter circuit a test signal having the same frequency as a fundamental frequency component of the wobble signal extracted at information recording time; a comparison part comparing a phase difference between a test signal outgoing from the filter circuit and the test signal supplying to the filter circuit; and a phase shift amount adjustment part adjusting the phase shift amount of the synchronization signal by the phase adjustment circuit based on the comparison.

The invention also relates to a phase shift amount adjustment apparatus for adjusting a phase shift amount for an optical disc apparatus including an optical pickup illuminating light to an information recording medium having an information track wobbled at a constant period, receiving light reflected from the information recording medium and generating a light receiver signal corresponding to an amount of the received light, a first filter circuit removing noise from a wobble signal based on wobbling of the information track from the light receiver signal, a second filter circuit extracting a frequency component around a fundamental frequency component of the wobble signal based on the wobbling of the information track from the light receiver signal, a multiplier multiplying an output signal from the first filter circuit by an output signal from the second filter circuit, a phase adjustment circuit adjusting a phase difference of the two signals supplied to the multiplier, and an information detection circuit detecting information included in the wobble signal based on an output signal from the multiplier, the apparatus including: an input part supplying a test signal having the same frequency as a fundamental frequency component of the wobble signal extracted at information recording time to the first filter circuit and the second filter circuit; a phase difference acquisition part acquiring a phase difference between a test signal outgoing from the first filter circuit and a test signal outgoing from the second filter circuit; and a phase difference adjustment part adjusting the phase difference between the two signals supplied to the multiplier by the phase adjustment circuit based on the phase difference acquired at the phase difference acquisition part.

According to another aspect of the invention, the phase difference acquisition part comprises: a first phase difference acquisition part acquiring a phase difference between a test signal outgoing from the first filter circuit and a test signal supplied to the first filter circuit; and a second phase difference acquisition part acquiring a phase difference between a test signal outgoing from the second filter circuit and a test signal supplied to the second filter circuit.

According to the present invention, since a phase difference between input and output signals to/from a filter circuit to which a wobble signal is supplied is detected and the phase of a recording start timing signal synchronized with a synchronization signal corresponding to the detected phase difference is adjusted, it is possible to perform a recording operation from the optimal recording start position without any effect of the phase difference in the filter circuit.

Also, according to the present invention, since a phase difference between input and output signals to/from a band pass filter path to which a wobble signal is supplied and a phase difference between input and output signals to/from a path of a high pass filter and a low pass filter are detected and phase adjustment is performed such that the phase of the band pass filter path matches the phase of the path of the high pass filter and the low pass filter, it is possible to demodulate ADIP information in the optimal status.

In particular, if these detection and adjustment operations are performed for each constant timing, it is possible to always start the recording operation from the optimal recording start position and demodulate the ADIP information in the optimal status. Also, since the reproduction speed varies during reproduction in CAV (constant angular speed), the frequency of a wobble signal accordingly varies, and thereby the optimal adjustment value also varies. However, if the detection and adjustment operations are performed in transition from the reproduction operation in CAV to the recording operation, it is possible to start the recording operation from the optimal recording start position and demodulate the ADIP information in the optimal status.

According to the present invention, an alternative signal to a wobble signal is supplied to the input side of a filter circuit, and the current phase difference between input and output signals to/from the filter circuit is detected. Then, the phase of a recording start timing signal determined based on a wobble signal is adjusted corresponding to the detected phase difference. As a result, it is possible to optimize the recording start position without any actual recording/reproduction operation on an optical disc for each optical disc apparatus.

Also, according to the present invention, since a phase difference between input and output signals to/from a band pass filter path to which a wobble signal is supplied and a phase difference between input and output signals to/from a path of a high pass filter and a low pass filter are detected and phase adjustment is performed such that the phase of the band pass filter path matches the phase of the path of the high pass filter and the low pass filter, it is possible to demodulate ADIP information in the optimal status.

In particular, the adjustment method for an optical disc apparatus can be used at a step of fabricating the optical disc apparatus as well as at maintenance time after distribution to markets.

BRIEF DESCRIPTION OF THE DRAWINGS

Other objects, features and advantages of the present invention will become more apparent from the following detailed description when read in conjunction with the accompanying drawings.

FIGS. 7A through 7O are waveform diagrams illustrating exemplary actuating signals of individual components thereof;

FIG. 21 is a waveform diagram illustrating signal characteristics corresponding to different levels of cutoff frequency fc;

FIGS. 22A and 22B are explanatory diagrams illustrating an aspect of misalignment of a recording start position;

DETAILED DESCRIPTION OF THE PREFERRED EMBODIMENTS

Figure 1A:
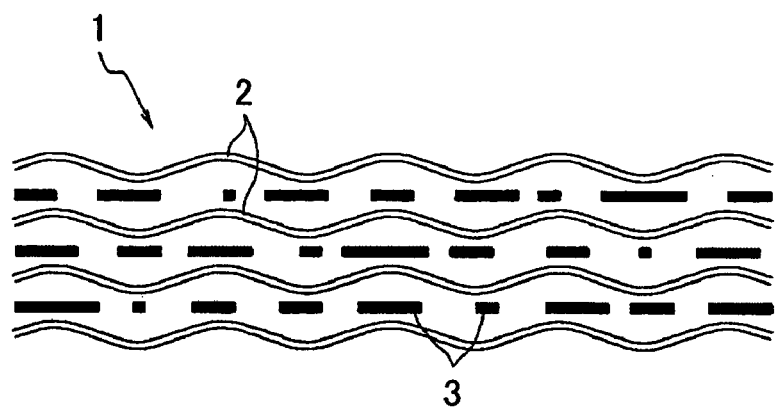
FIGS. 1A and 1B are explanatory schematic diagrams for an information track of an optical disc.
Figure 1B:
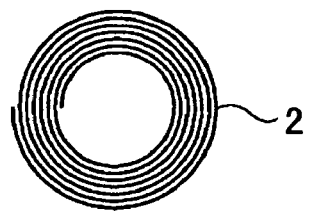

In the following, preferred embodiments of the present invention will be described with reference to FIG. 1 through FIG. 19. These embodiments demonstrate applications to an optical disc apparatus having a wobble signal detection circuit directed to an optical disc (information recording medium) 1, such as DVD+RW, on which information can be recorded. As illustrated in FIG. 1A, the optical disc 1 includes information tracks 2, each of which wobbles at a constant cycle, and the information tracks 2 are spirally formed in advance on the substrate of the optical disc 1 in accordance with a manner of phase shift keying (PSK), as illustrated in FIG. 1B. In FIG. 1A, exemplary record marks 3 are shown as black-colored portions.

Figure 2:
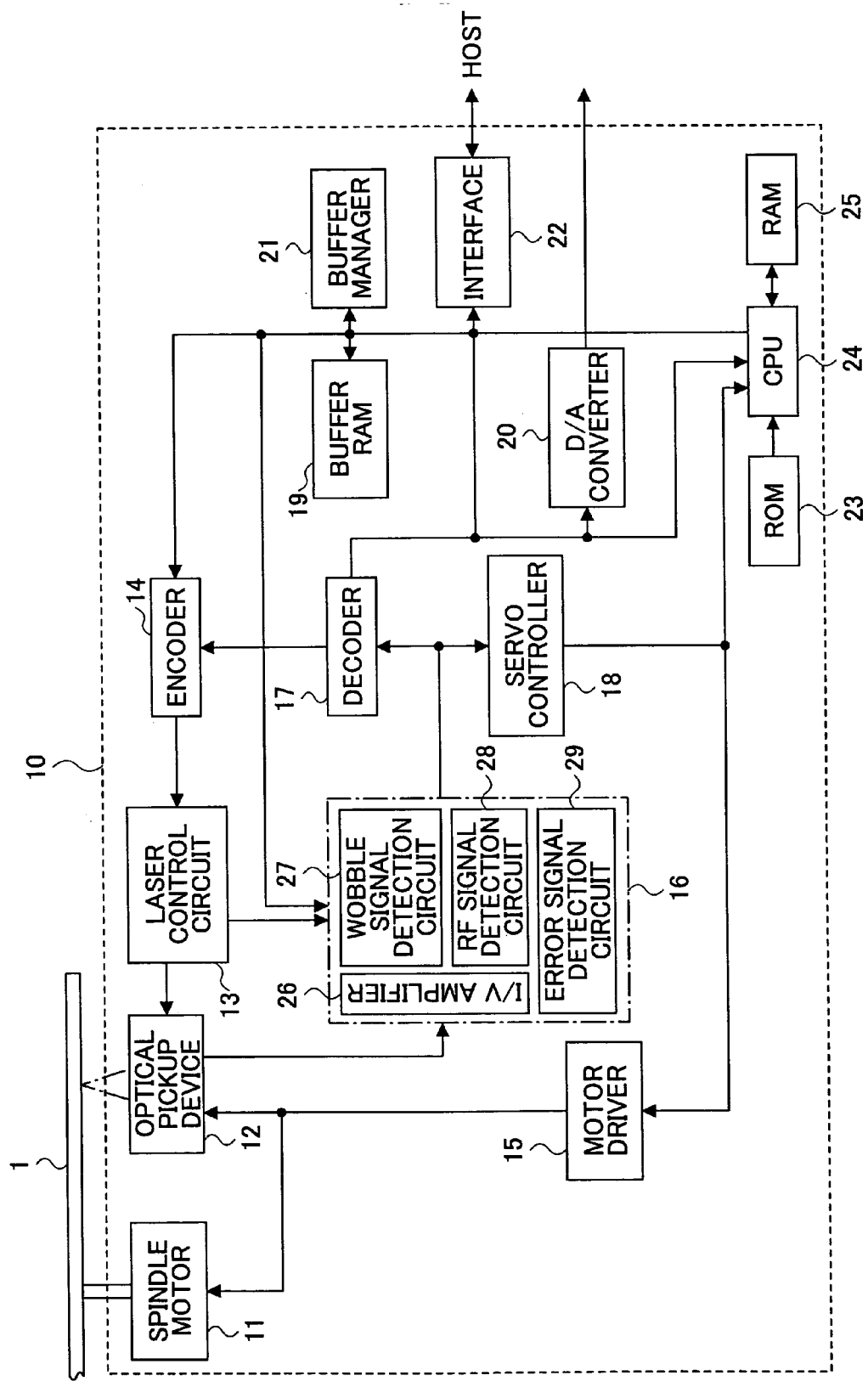
FIG. 2 is a schematic diagram illustrating an exemplary structure of an optical disc apparatus.

FIG. 2 is a schematic diagram illustrating an exemplary structure of an optical disc apparatus 10 having a wobble signal detection circuit according to an embodiment of the present invention. The optical disc apparatus 10 includes a spindle motor 11 to rotationally drive the optical disk 1, an optical pickup device 12, a laser control circuit 13, an encoder 14, a motor driver 15, an analog signal processing circuit 16, a decoder 17, a servo controller 18, a buffer RAM 19, a D/A converter 20, a buffer manager 21, an interface 22, ROM 23, CPU 24 and RAM 25. It is noted that arrows drawn in FIG. 2 represent streams of signals and information rather than all connection relations between individual blocks.

The optical pickup device 12 includes a semiconductor laser serving as an illuminant, an optical system for guiding a light beam emitted from the semiconductor laser on a recording surface of the optical disc 1 and a return beam light reflected from the recording surface to a predefined light receiving position, a light receiver, which is disposed at the light receiving position, to receive the return light beam, and a drive system (a focusing actuator, a tracking actuator, a seek motor and so on) (none of which is illustrated).

Figure 3A:
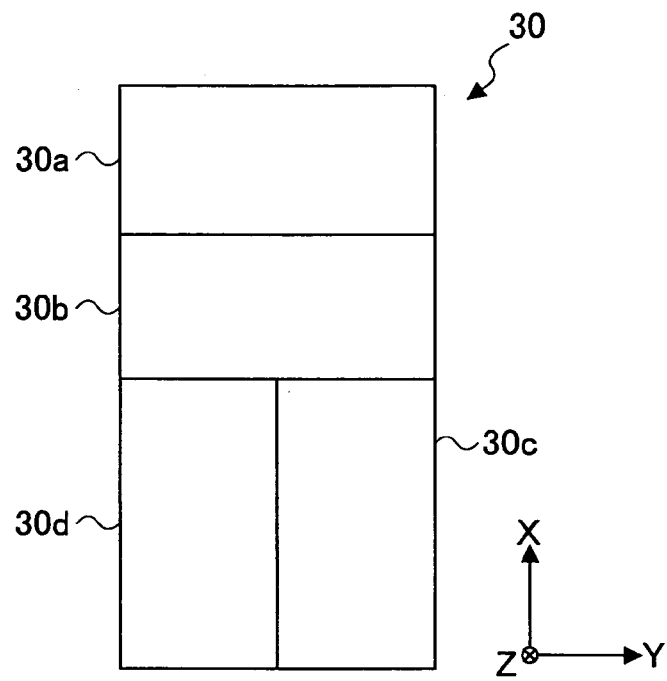
FIGS. 3A and 3B are front views illustrating an exemplary structure of a light receiver.

As illustrated in FIG. 3A, the light receiver of the optical pickup device 12, for example, may be configured to include four-divided light receiving elements (first through fourth receiving elements 30a through 30d). In FIG. 3A, for convenience, the bottom-to-top direction on the drawing is defined as an X-axis direction. Also, the left-to-right direction is defined as a Y-axis direction, and the vertical direction with respect to the surface of the drawing is defined as a Z-axis direction. Each of the first and second light receiving elements 30a and 30b has the same rectangular shape whose longer edges are positioned along the left-to-right direction (Y-axis direction) in FIG. 3A, and the first and second light receiving elements 30a and 30b are adjacently disposed each other with respect to the bottom-to-top direction (X-axis direction). On the other hand, each of the third and fourth light receiving elements 30 c and 30 d has the same rectangular shape whose longer edges are positioned along the bottom-to-top direction (X-axis direction) in FIG. 3A, and the third and fourth receiving elements 30c and 30d are adjacently disposed each other with respect to the left-to-right direction (Y-axis direction).

Figure 3B:
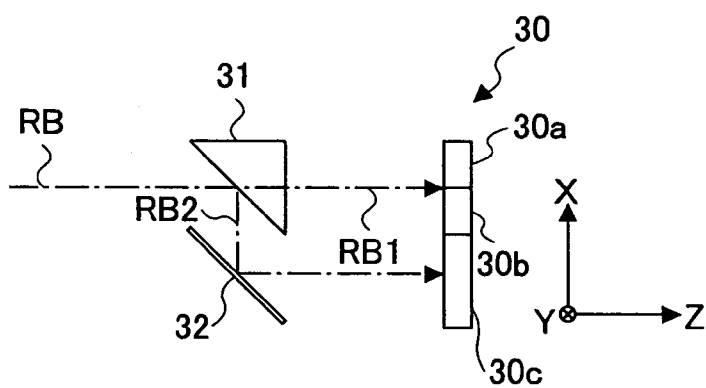

As shown in FIG. 3B, reflected light RB from the recording surface of the optical disc 1 is split in two directions by a prism 31 of the optical system of the optical pickup device 12, and one reflected light RB1, which passes through the prism 31, travels toward the first and second light receiving elements 30a and 30b. On the other hand, the other reflected light RB2 is split in the −X direction by the prism 31, and the traveling direction of the RB2 is curved in the +Z direction by a reflection mirror 32 so that RB2 can travel toward the third and fourth light receiving elements 30c and 30d.

Figure 4A:
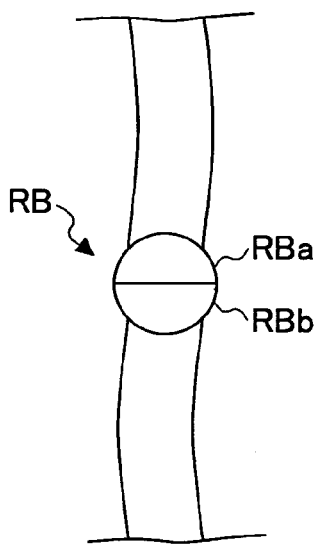
FIGS. 4A and 4B are side views illustrating an exemplary structure of a light receiver.
Figure 4B:
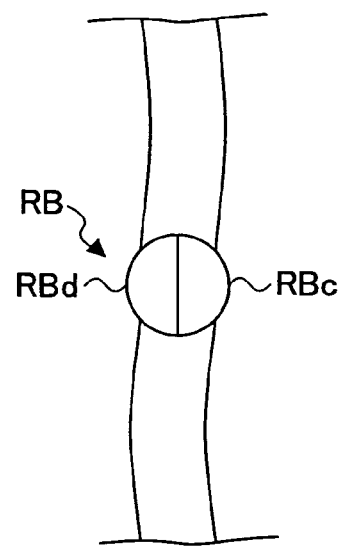

Here, as illustrated in FIG. 4A, reflected light RBa, which is an upper portion of the reflected light RB in the FIG. 4A, travels to the first light receiving element 30a, and reflected light RBb, which is a lower portion thereof, travels to the second light receiving element 30b. On the other hand, as illustrated in FIG. 4B, reflected light RBc, which is a right portion of the reflected light RB in the FIG. 4B, travels to the third light receiving element 30c, and reflected light RBd, which is a left portion thereof, travels to the fourth light receiving element 30d. Each of the first through fourth light receiving elements 30a through 30d conducts photoelectric conversion, and supplies a current (current signal) corresponding to an amount of received light, as a photoelectric converted signal, to the analog signal processing circuit 16.

It is noted that the light receiver is not limited to the four-divided light receiving element 30. For example, the light receivers may be configured from a two-divided light receiving element including the first and second light receiving elements 30a and 30b and a two-divided light receiving element including the third and fourth light receiving elements 30c and 30d. Alternatively, the light receiver may be configured in such a way that the first through fourth light receiving elements 30a through 30d are arranged in line. The light receiver may be arbitrarily configured in terms of shape, arrangement or the like.

Referring back to FIG. 2, the analog signal processing circuit 16 includes an I/V amplifier (current-voltage conversion amplifier) 26 to convert current signals, which are output signals supplied from the light receiving elements 30a through 30d of the optical pickup device 12, into voltage signals, a wobble signal detection circuit 27 to detect a wobble signal, an RF signal detection circuit 28 to detect an RF signal including reproduced information, and an error signal detection circuit 29 to detect a focus error signal and a track error signal.

Figure 5:
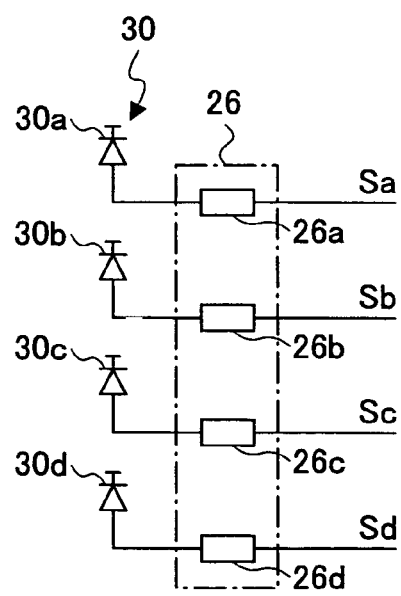
FIG. 5 is a schematic circuit diagram illustrating an exemplary structure of an I/V amplifier.

As shown in FIG. 5, the I/V amplifier 26 includes I/V amplifiers 26a through 26d to convert current signals supplied from the first through fourth receiving elements 30a through 30d into voltage signals (signals Sa through Sd).

In the RF signal detection circuit 28, all the voltage signals Sa through Sd are added, and the result of addition is digitized and detected as an RF signal.

In the error signal detection circuit 29, the difference between voltage signals Ra and Rb is computed. The computed result is digitized and detected as a focus error signal. Also, the difference between voltage signals Rc and Rd is computed. The computed result is digitized and detected as a track error signal. The detected focus error signal and track error signal are supplied from the error signal detection circuit 29 to the servo controller 18.

In the wobble signal detection circuit 27, a wobble signal is detected based on the voltage signals Sc and Sd and is supplied to the decoder 17. Here, the structure of the wobble signal detection circuit 27 is described later.

In the decoder 17, address information, a synchronization signal and the like are extracted from ADIP information included in the wobble signal detected by the wobble signal detection circuit 27. The extracted address information is supplied to CPU 24, and the extracted synchronization signal is supplied to the encoder 14.

In the decoder 17, additionally, reproduction processes, such as demodulation and error correction, are performed on the RF signal detected by the RF signal detection circuit 28. Also, in case of reproduced data other than sound data (for example, image data, document data and so on), the decoder 17 performs error check and error correction based on a check code attached to the data, and stores the resulting data in the buffer RAM 19 via the buffer manager 21.

In the servo controller 18, a control signal for controlling the focusing actuator of the optical pickup device 12 is generated based on the focus error signal detected by the error signal detection circuit 29, and is supplied to the motor driver 15. Also, the service controller 18 generates a control signal for controlling the tracking actuator of the optical pickup device 12 based on the track error signal detected by the error signal detection circuit 29, and supplies the generated signal to the motor driver 15.

In the D/A converter 20, if data recorded in the optical disk 1 are sound data, an output signal from the decoder 17 is converted into analog data, and the analog data are supplied as an audio signal to audio equipment or the like.

The buffer manager 21 manages storage of accumulated data into the buffer RAM 19, and if the accumulated amount of data reaches a predefined amount, the buffer manager 21 reports this fact to CPU 24.

The motor driver 15 drives the focusing actuator and the tracking actuator of the optical pickup device 12 based on the control signals supplied from the servo controller 18. Also, the motor driver 15 controls the spindle motor 11 in accordance with instructions of CPU 24 so that the linear velocity (CLV) or the rotation rate (CAV) of the optical disc 1 can be made constant. Additionally, the motor driver 15 drives the seek motor in accordance with instructions of CPU 24 so as to control the position of the optical pickup device 12 with respect to a sledge direction (radius direction of the optical disc 1).

The encoder 14 attaches error correction codes to data in the buffer RAM 19, and generates write data in the optical disc 1. Then, in accordance with instructions from CPU 24, the encoder 14 supplies the write data to the laser control circuit 13 in synchronization with a synchronization signal from the decoder 17.

The laser control circuit 13 controls output of the semiconductor laser of the optical pickup device 12 based on the write data from the encoder 14. During recording, the laser control circuit 13 supplies a timing signal synchronized with a mark recording period and a space recording period to the wobble signal detection circuit 27.

The interface 22 is a bidirectional communication interface with a host (for example, a personal computer), and complies with a standard interface such as ATAPI (At Attachment Packet Interface) and SCSI (Small Computer System Interface).

CPU 24 controls operations of the above-mentioned components in accordance with programs in ROM 23, and temporarily stores data necessary for control in RAM 25.

Figure 6:
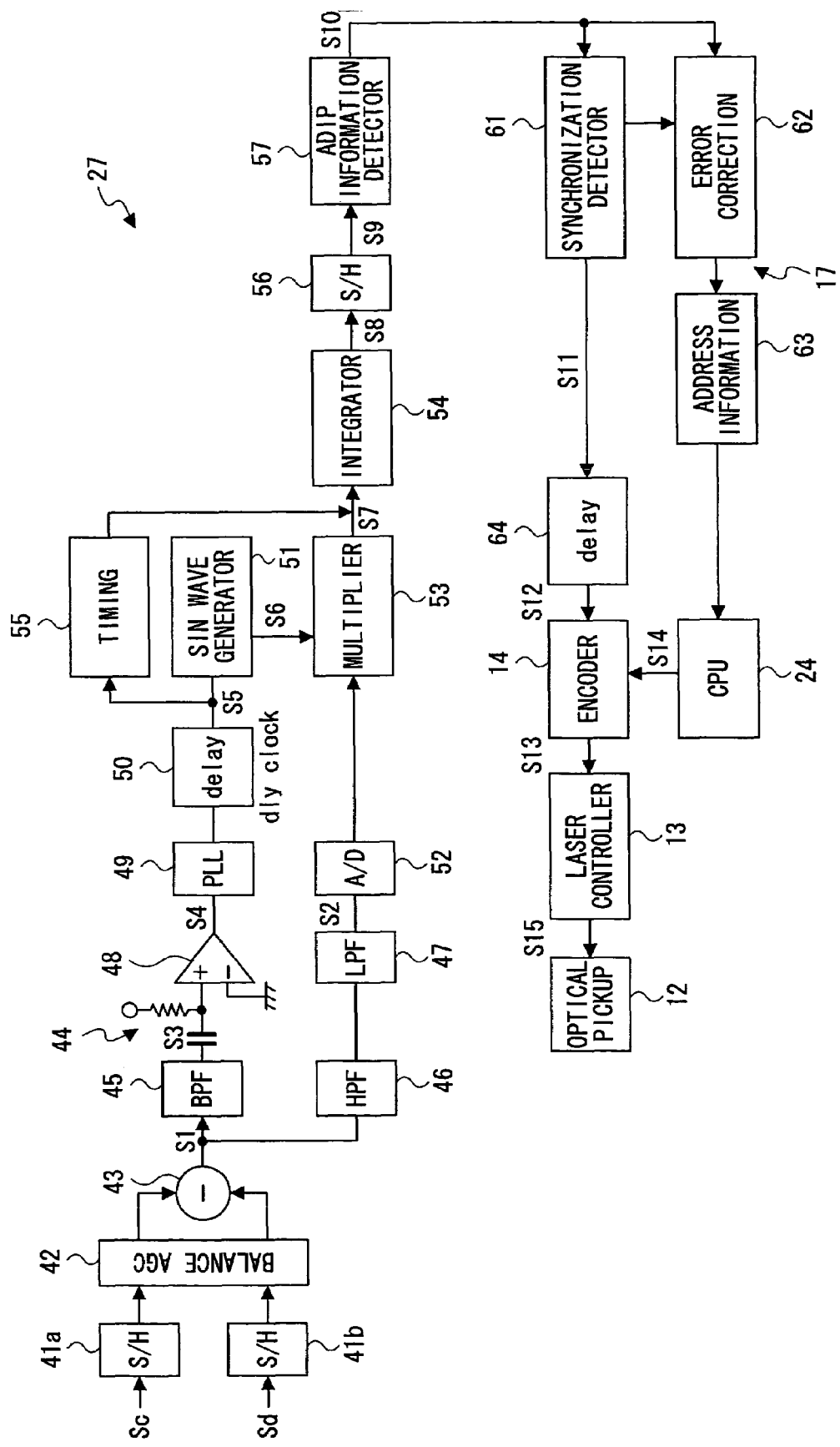
FIG. 6 is a block diagram illustrating an exemplary structure of a wobble signal detection circuit and others.

Next, an exemplary structure of the wobble signal detection circuit 27 and the output side thereof are described with reference to FIG. 6. The wobble signal detection circuit 27 is provided with sample hold circuits (S/H) 41a and 41b to which the voltage signals Sc and Sd are supplied from the I/V amplifiers 26c and 26d, and a balance AGC 42 to take balance between the amplitudes of the voltage signals Sc and Sd after the sample-holding is provided with the output sides of S/H 41a and 41b.

At the output side of the balance AGC 42, a subtracter 43 is provided to compute the difference Sc−Sd between the voltage signals Sc and Sd after sample-holding. At the output side of the subtracter 43, a filter circuit 44 is provided. The filter circuit 44 includes a digital wobble signal BPF path for BPF (Bandwidth Passage Filter) 45 and an analog wobble signal HPF+LPF path for HPF (High-band Passage Filter) 46 and LPF (Low-band Passage Filter) 47.

At the output side of BPF 45, for example, a digitizer 48 using a comparator is provided. BPF 45 allows passage for the frequency of a carrier of a wobble signal (portion other than a phase modulated portion of the wobble signal), that is,. BPF 45 allows passage for a limited frequency bandwidth in the vicinity of the fundamental frequency of the wobble signal. As a result, BPF 45 can reduce noise and a phase modulated component from a wobble signal, and it becomes easier to generate a signal corresponding to a carrier component of a wobble signal.

This signal corresponding to the carrier component, if the optical disc 1 is rotated in CLV, has a constant frequency. On the other hand, a signal passing through HPF 46 and LPF 47 becomes a wobble signal from which high-frequency and low-frequency noise components are removed. It is noted that if noise can be removed to an acceptable degree for obtaining the ADIP information with only LPF 47, HPF 46 may be omitted.

A PLL circuit 49 and a timing adjustment delay circuit 50 are provided in that order for stabilizing the period of a digital wobble signal from the digitizer 48, and a sin wave generation circuit 51 is further provided for generating a sin wave having the same phase as the digital wobble signal.

On the other hand, an A/D converter 52 to convert an analog wobble signal from LPF 47 into digital data is provided. A multiplier 53 is provided to multiply the analog wobble signal A/D-converted by the A/D converter 52 by the digital wobble signal converted into a sin wave. At the output side of the multiplier 53, an integrator 54 to compute integral of the result of multiplication is provided. The integrator 54 is reset for each period of a wobble in response to a reset signal supplied from a timing circuit 55 for generating and supplying a timing signal synchronized with the output of the PLL circuit 49 (output of the delay circuit 50).

At the output side of the integrator 54, an ADIP information detector 57 is provided via the sample hold circuit (S/H) 56.

The ADIP information detector 57 is connected to the decoder 17. The decoder 17 includes a synchronization detector 61 to detect a synchronization signal ADIP sync (detect phase modulation of a wobble signal) based on the ADIP information, an error correction part 62 to correct an error, and an address information extraction part 63 to extract address information based on error-corrected ADIP information.

After the synchronization signal ADIP sync detected by the synchronization detector 61 passes through the delay circuit 64, which is a phase adjustment circuit for shifting the phase of an input signal and supplying the resulting signal, the resulting synchronization signal ADIP sync is supplied to the encoder 14 and is used to generate a write timing signal (recording start timing signal). Also, a write instruction (or a read instruction) is supplied from CPU 24 to the encoder 14 at a predefined timing, and the laser control circuit 13 is set to, in response to generation of a write timing signal under the status where the write instruction is provided, start a recording operation.

An outline of exemplary signal processing in the vicinity of the wobble signal detection circuit 27 in the above structure is described with reference to a waveform diagram of FIG. 7. The voltage signals Sc and Sd, which are supplied from the I/V amplifiers 26c and 26d, are sample-held by S/H 41a and 41b, respectively. After the sample-holding, the balance AGC 42 takes amplitude balance between the resulting signals, and then the subtracter 43 computes the difference Sc (after S/H)–Sd (after S/H).

Since the wobble signal WBL=S1 (see FIG. 7A) on the optical disc 1 cannot be actually handled without modification, the difference Sc (after S/H)–Sd (after S/H), resulting from the above amplitude-balancing and operation, is considered as the wobble signal WBL=S1 on the medium. The wobble signal WBL=S1 is supplied to the filter circuit 44. On one hand, an analog wobble signal S2, as illustrated in FIG. 7B, is generated via the path through HPF 46 and LPF 47, and on the other hand, a wobble signal S3, as illustrated in FIG. 7C, is generated to generate a signal composed of a fundamental frequency component. In addition, the wobble signal WBL=S1 is digitized by passing through the digitizer 48, and a digital wobble signal S4, as illustrated in FIG. 7D, is generated.

The digital wobble signal S4 passes through the PLL circuit 49 so as to generate a stable signal having a predefined period. Then, the delay circuit 50, which is a phase adjustment circuit, performs "dlyclock" delay operation on the resulting signal, and the resulting signal is supplied as a digital wobble signal S5, as illustrated in FIG. 7E, to the sin wave generation circuit 51. In the sin wave generation circuit 51, a sin wave S6, as illustrated in FIG. 7F, is generated to have the same phase as the digital wobble signal S5.

Then, the multiplier 53 multiplies the analog wobble signal S2 converted by the A/D converter 52 by the digital wobble signal converted into the sin wave S6. The integrator 54 computes integral on the multiplied result signal S7, as shown in FIG. 7G, and thereby an integral result signal S8, as shown in FIG. 7H, is obtained. The integral result signal S8 is sample-held by S/H 56, and is supplied as a signal, as shown in FIG. 7I, to the ADIP information detector 57.

Based on the signal S9, the ADIP information detector 57 detects ADIP information S10, as shown in FIG. 7J, including address information and a synchronization signal. In the decoder 17, to which the ADIP information S10 is supplied, the synchronization detector 61 generates an ADIP synchronization signal ADIPsync=S11, as illustrated in FIG. 7K. After the ADIP synchronization signal ADIPsync=S11 passes through the delay circuit 64, which is a phase adjustment circuit for shifting the phase of an input signal and supplying the resulting signal, the ADIP synchronization signal ADIPsync=S11 is converted into an ADIP synchronization signal ADIPsync=S12, and the converted signal is supplied to the encoder 14. Based on the ADIP synchronization signal ADIPsync=S12, the encoder 14 generates a write timing signal S13, and uses the laser control circuit 13 to start recording under an AND condition of the write timing signal S13 and a write instruction S14 from CPU 24.

It is supposed that a constant time interval e is set between the synchronization signal ADIPsync and the write timing signal (for example, 16wbl period=32T×15). Also, it is supposed that the synchronization signal ADIPsync and the write timing signal change in such a way that LEHAL during every unit of ADIP time (=93wbl period=32T×93) and that the phase modulated portion, which is located at the head of the ADIP time unit, is in H (which is represented as "#0" in FIG. 7).

In such an operation, there arises no phase difference that can affect phase demodulation or the like before filtering by the filter circuit 44, that is, at the time of the signal S1. After the filtering by the filter circuit 44, however, there is a risk that a phase difference may arise for an analog wobble signal, for example, due to fluctuation of the cutoff frequency fc of LPF 47. In such a case, there is a risk that a generation timing difference may arise for the write timing signal S13 and thereby the recording start position may be misplaced from the optimal position. The interval "a" in FIG. 7B represents phase lag due to LPF 47.

Figure 8:
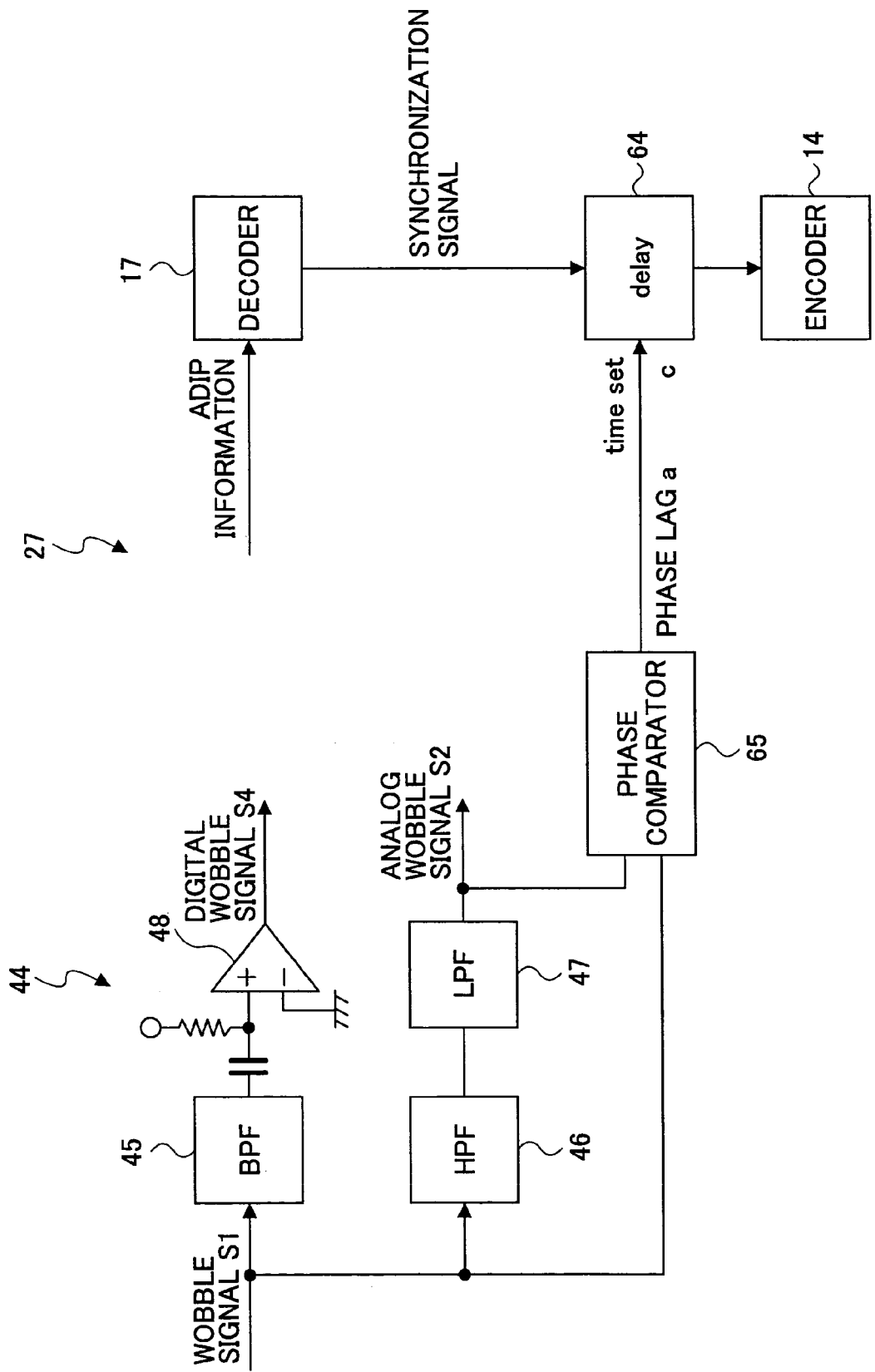
FIG. 8 is a schematic block diagram illustrating a selected portion of a wobble signal detection circuit.

In order to eliminate this problem, according to this embodiment of the present invention, an adjustment function is provided to adjust the misplaced recording start position, which is based on the phase difference in the filter circuit 44, to the optimal position. Referring to FIG. 8 illustrating a selected portion of the wobble signal detection circuit 27, according to this embodiment, the filter circuit 44, to which the wobble signal S1 is supplied from the optical disc 1, is provided with a phase comparator 65 serving as a phase difference detection part to detect the phase difference between input and output signals to/from the path of HPF 46 and LPF 47. For example, the phase comparator 65 can detect the phase difference corresponding to the phase lag "a" shown in FIG. 7B.

On the other hand, the optical disc apparatus 10 is provided between the synchronization detector 61 and the encoder 14 with a delay circuit 64 serving as an adjustment part for adjusting the phase of the synchronization signal ADIPsync=S11, which may be affected to timing of the write timing signal S13, as needed. The phase can be arbitrarily adjusted by setting delay time "timeset" (setup parameter of the recording start position) of the delay circuit 64.

Figure 9:
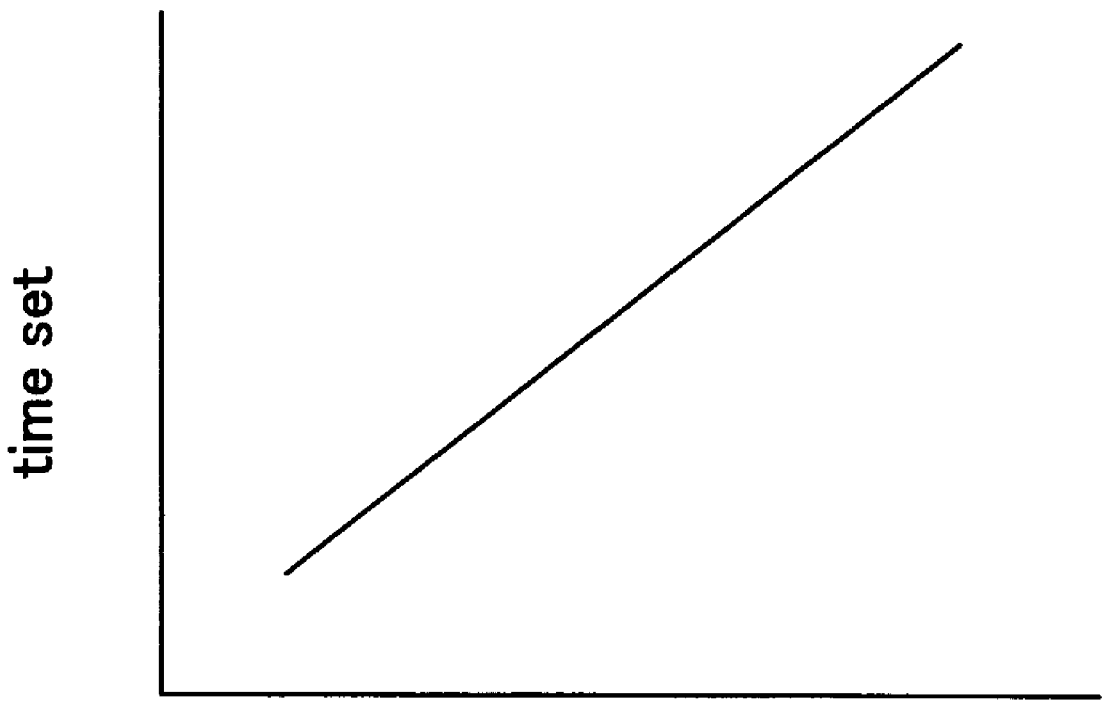
FIG. 9 is a characteristic diagram illustrating an exemplary relation between a phase difference between input and output signals and a delay time.

There is a proportionality relation, as illustrated in FIG. 9, between the phase difference between the input and output signals to/from the path of HPF 46 and LPF 47 and the delay time "timeset". The proportionality relation shown in FIG. 9 can be easily created by recording "timeset" while variation of "timeset", for example, while variation of a mirror disc per unit of ECC, and making measurement on relevant portions, for example, reproducing the relevant portions. Such a proportionality relation is determined in advance, and the delay time "timeset" of the delay circuit 64 is adjusted depending on phase differences detected by the phase comparator 65. As a result, it is possible to optimize the timing of the write timing signal S13.

Figure 10:
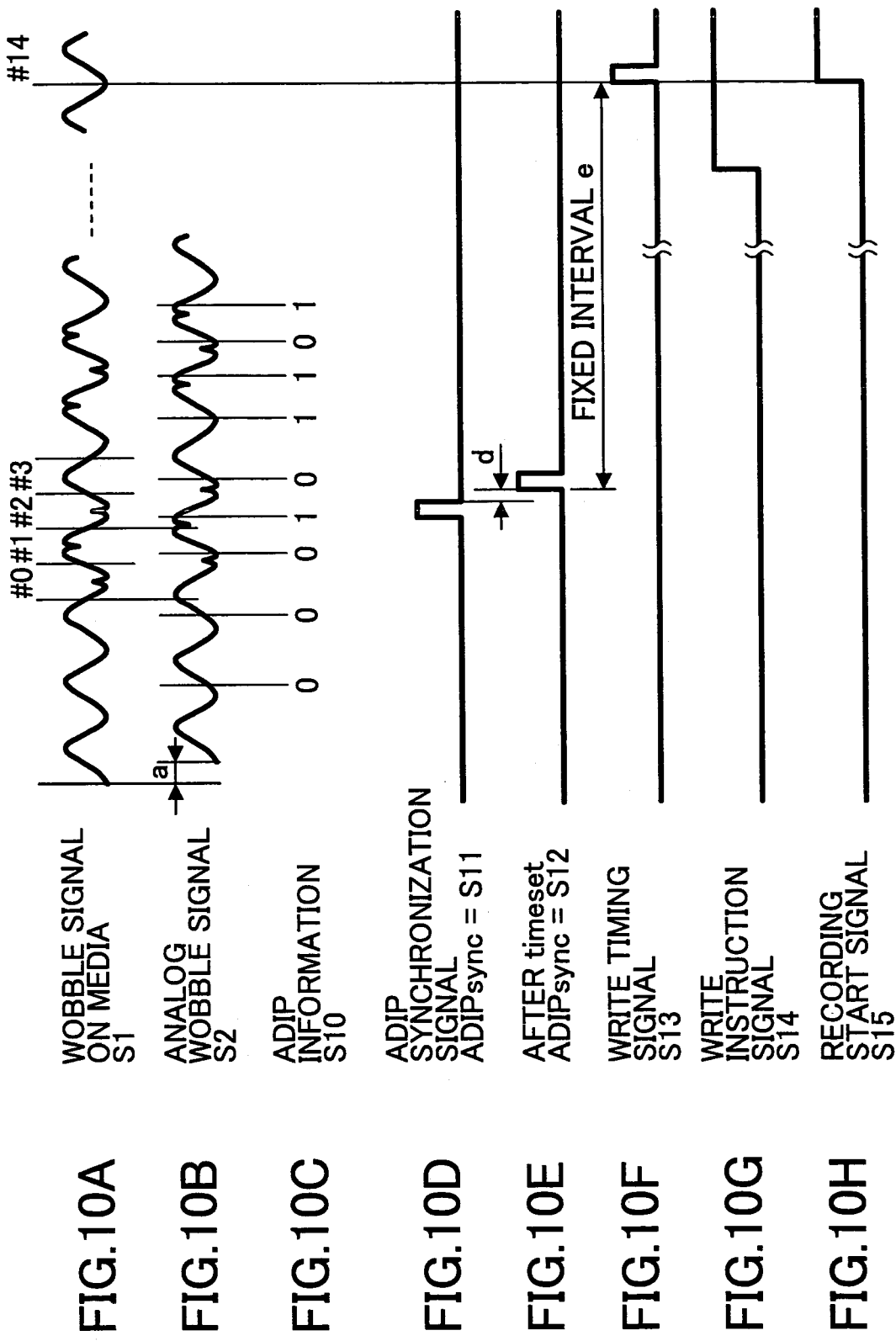
FIGS. 10A through 10H are waveform diagrams illustrating some exemplary actuating signals.

Here, the adjustment of recording timing based on the phase differences detected by the phase comparator 65 is described in detail with reference to FIG. 10 illustrating a selected portion of the exemplary operation at actual recording time in FIG. 7. FIG. 10 is a waveform diagram illustrating the phase lag "a" in the path of HPF 46 and LPF 47 in the filter circuit 44 and an exemplary relation between an amount of delay "d" by the delay circuit 64 and the write timing signal S13.

Corresponding to an amount of phase lag of the analog wobble signal S2 in the path of HPF 46 and LPF 47, that is, the phase lag "a", the phase of the synchronization signal ADIPsync=S11 by the synchronization detector 61 is delayed. Then, corresponding to the delay amount "d" in "timeset", the phase of the synchronization signal ADIPsync=S12 after delay processing of the delay circuit 64 is delayed. Also, it is supposed that there is a difference of a constant interval e in the phase relation between the synchronization signal ADIPsync=S12 and the write timing signal S13.

In accordance with a standard, the wobble signal wbl is configured to have 93 periods as one block, and the write start timing is set to the position of wbl#14+24T ("wbl#14"

is a signal of the 15th period counted from the phase modulated portion "wbl#0", and one period of a wobble=32T).

Here, "24T" represents 1T×24 of an RF signal. For example, if the disc rotation rate is ×1, 1T is approximately equal to 38.5 ns. If the disc rotation rate is ×2, 1T is approximately equal to 19.2 ns. If the disc rotation rate is ×4, 1T is approximately equal to 9.6 ns, and so on. It is noted that since the detected wobble signal is delayed by about 1 period relative to the actual wobble signal on the optical disc 1, as shown in FIG. 7, the recording starts closely with the position of "wbl#15+24T" on the optical disc 1 ("#15" in FIG. 15 means this fact).

In this case, if $$a + d + e = wbl \text{ 16 period} + 24 \text{ bit}$$
$$= 16 \times 32T + 24T,$$

then it is determined that the write timing signal complies with the standard. Thus, the delay time "timeset" may be adjusted such that $$d=16 \times 32T+24T-a-e.$$

In this manner, according to this embodiment, the wobble signal S1 obtained from the information tracks 2 of the optical disc 1 is supplied to the input side of the filter circuit 44 of the optical disc apparatus 10. At this time, the phase comparator 65 detects a phase difference between signals at the input and output sides of the path of HPF 46 and LPF 47, and the delay time "timeset" of the delay circuit 64 is adjusted depending on the detected phase difference. As a result, the timing of the write timing signal can be optimized. Accordingly, it is possible to start recording from the optimal recording start position without affecting the phase difference of the filter circuit 44.

In particular, if these detection and adjustment operations are periodically performed at a constant timing, it is possible to always start the recording from the optimal recording start position without any affection of drastic variation of source voltage and temperature. Also, in accordance with CAV (constant angular velocity), since the reproduction speed fluctuates during reproduction, the frequency of a wobble signal correspondingly fluctuates, and thereby the optimally adjusted value may vary. However, if the above-mentioned detection and adjustment operations are performed in transition from the CAV reproduction to the recording, it is possible to start the recording from the optimal recording start position.

In this embodiment, the phase comparator 65 detects the phase difference between the signals at the input and output sides of the path of HPF 46+LPF 47. In another embodiment, the phase difference between signals at input and output sides of BPF 45 may be detected, and the delayed amount "timeset" of the delay circuit 64 may be adjusted depending on the detected phase difference. In this case, the phase of the analog wobble signal is adjusted corresponding to the phase of the digital wobble signal.

Figure 11:
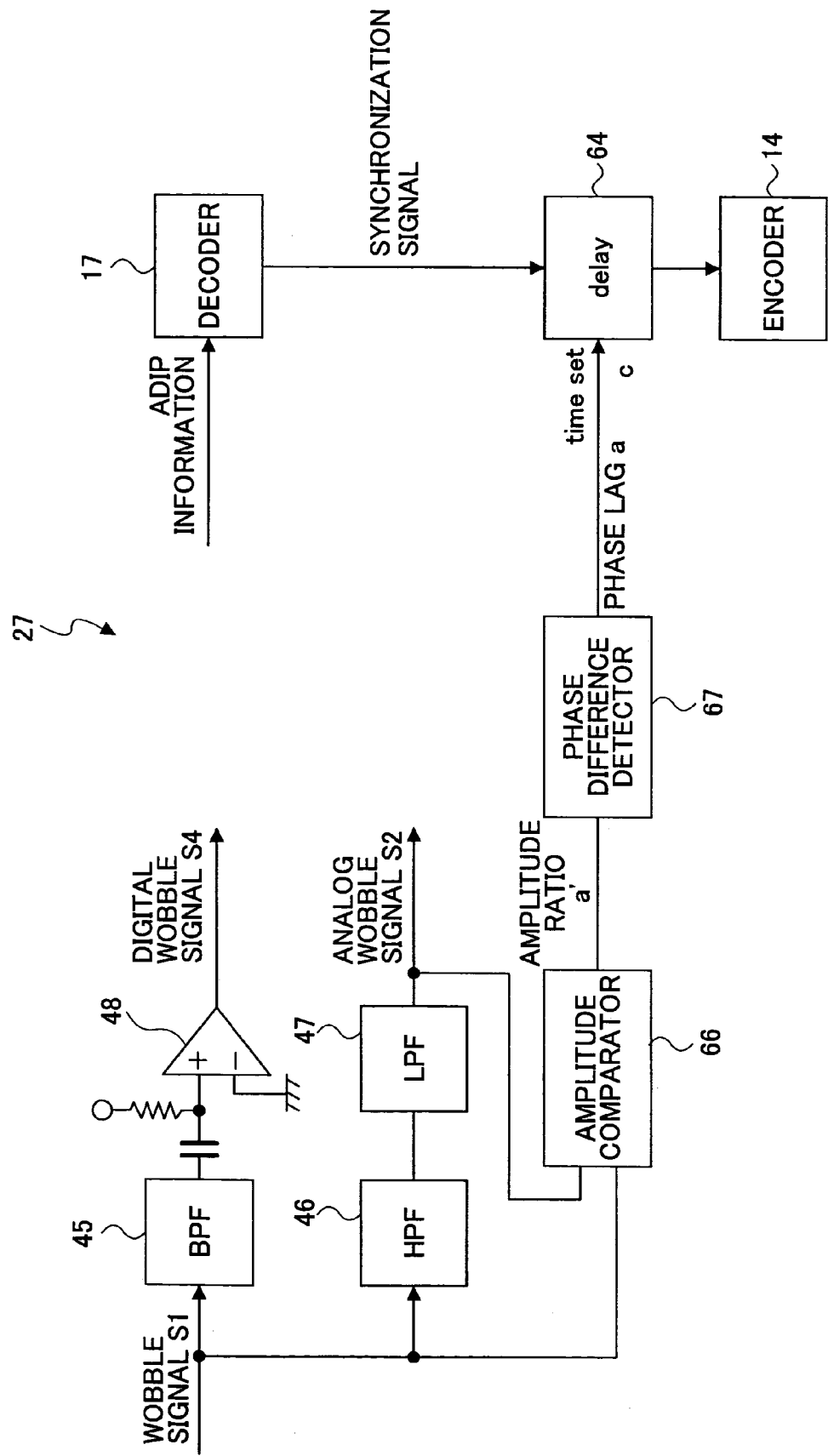
FIG. 11 is a schematic block diagram illustrating an exemplary structure of another embodiment on a phase difference detection method.

Also, in this embodiment, the phase comparator 65 directly detects the phase difference between signals at input and output sides of the filter circuit 44. In another embodiment, for example, as illustrated in FIG. 11, an amplitude comparator (amplitude ratio detection part) 66 may detect an amplitude ratio "a'" (=(the amplitude of an output from the path of HPF 46+LPF 47)/(the amplitude of an input of the path of HPF 46+LPF 47)) of signals at input and output sides of the path of HPF 46+LPF 47 in case of the wobble signal S1 based on the information tracks 2 being supplied. Then, based on the amplitude ratio "a'", a phase difference detector (phase difference detection part) 67 may detect the phase difference (phase lag) "a", and adjust the delay time "timeset" of the delay circuit 64.

In this case, filter characteristics of LPF 47 are measured in advance, and a relation between the amplitude ratio corresponding to the filter characteristics and the phase lag is written in a control program. Then, the phase difference detector 67 can use the relation to compute the phase difference "a" based on the amplitude ratio "a'".

Figure 12:
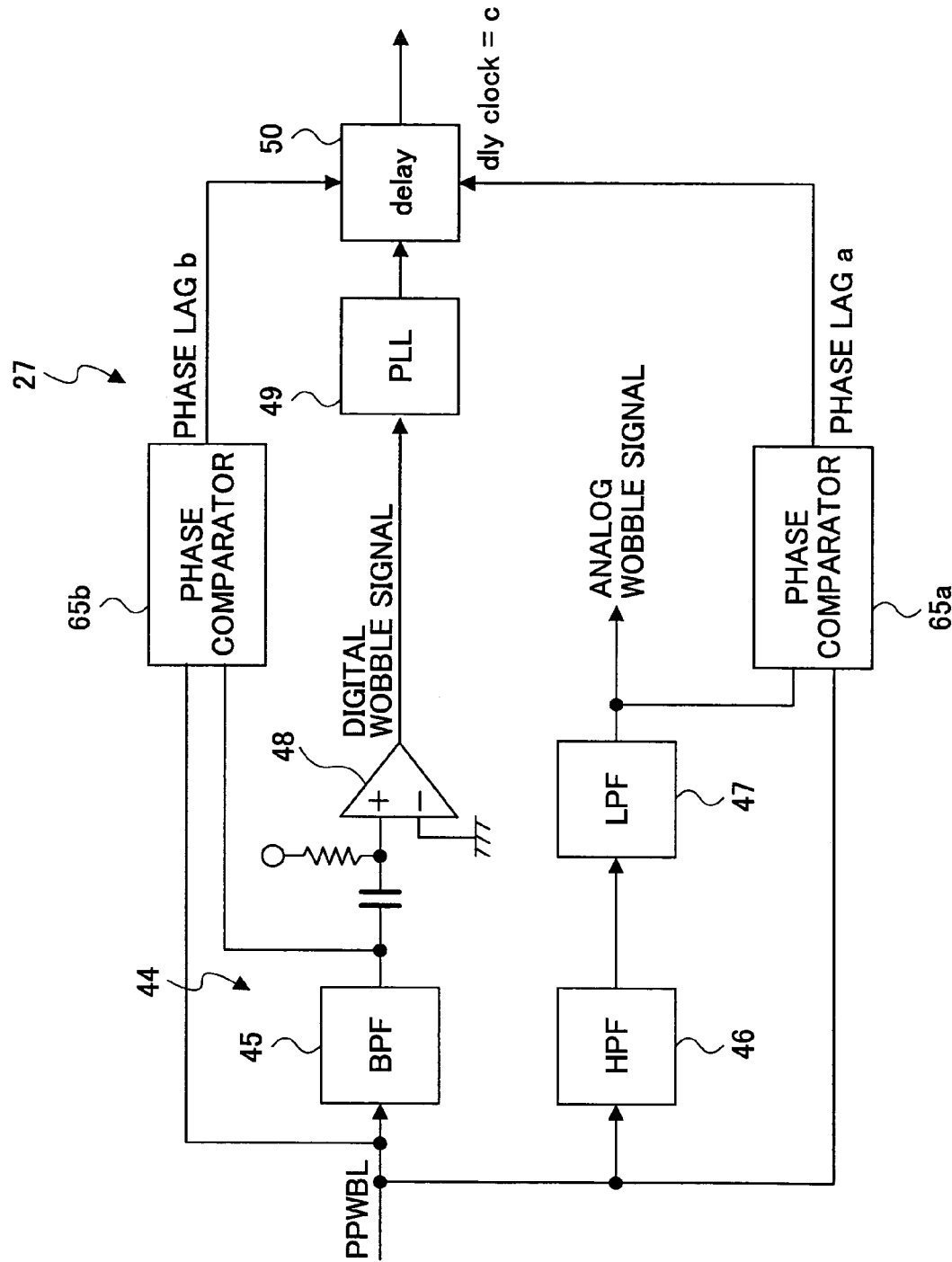
FIG. 12 is a schematic block diagram illustrating a selected portion of a wobble signal detection circuit according to another embodiment of the present invention.

Another embodiment of the present invention is described with reference to FIG. 12 and FIG. 13. In this embodiment, the optical disc apparatus 10 is provided with an adjustment function to eliminate poor demodulation characteristics of ADIP information due to the phase difference in the filter circuit 44. FIG. 12 shows only a relevant portion in the wobble signal detection circuit 27.

In this embodiment, the optical disc apparatus 10 is provided with a phase difference detector (phase difference detection part) 65a to, in case of the wobble signal S1 obtained based on wobbling of the information tracks 2 being supplied to the filter circuit 44, detect the current phase difference "a" between signals at input and output sides of the path of HPF 46+LPF 47 and a phase difference detector (phase difference detection part) 65b to detect the phase difference "b" between signals at input and output sides of the path of BPF 45. Based on the detection results of the phase comparators 65a and 65b, the delay time "dlyclock" of the delay circuit 50, which serves as an adjustment part and is disposed after the PLL circuit 49, is adjusted in such a way that the phases of both paths can be the same.

Figure 13:
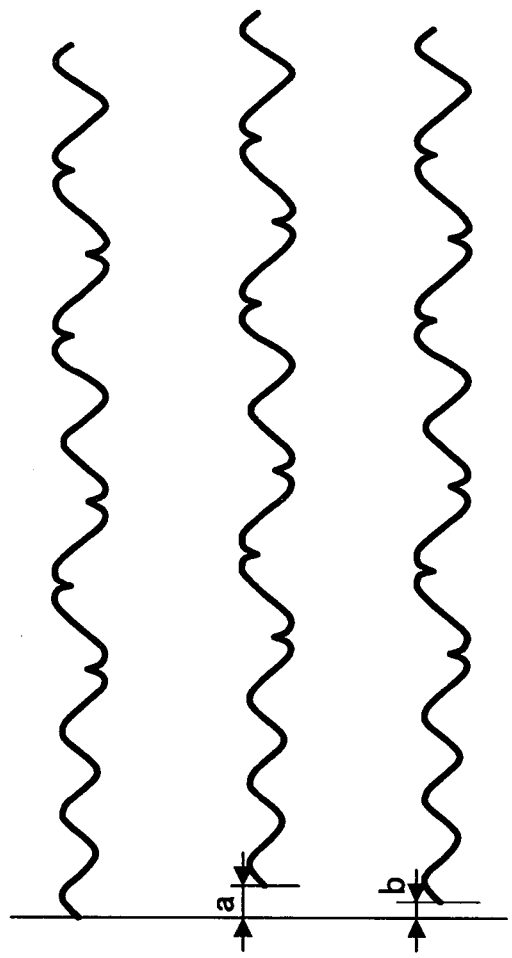
FIGS. 13A through 13C are waveform diagrams illustrating a phase relation between involved signals.

FIG. 13 is a waveform diagram illustrating an exemplary relation among the phase of the wobble signal S1 before filtering, the phase of the analog wobble signal S2 after passage through LPF 47 and others, and the phase of the digital wobble signal S3 (before digitization by the digitizer circuit 48) after passage through BPF 45. In the path of HPF 46+LPF 47, the phase of the analog wobble signal S2 is delayed by "a". In the path of BPF 45, the phase of the digital wobble signal S3 is delayed by "b".

Before the sin wave generation circuit 51 generates a sin-shaped digital wobble signal, the phase lag corresponding to "c" can be provided by the delay time "dlyclock" set in the delay circuit 50 (see FIG. 7 etc.). At time of ADIP demodulation, the multiplier 53 multiplies sin wave=S6 by the analog wobble signal S2. As a result, it can be concluded that as the amplitude after the multiplication is higher, ADIP information is demodulated better. In order to do so, it is required that the phase relation between the sin wave and the analog wobble signal be in phase.

Thus, when the formula "a=b+c" holds, there is the highest probability that the phase relation between the analog wobble signal and the digital wobble signal can be in phase. In this case, it is possible to demodulate the ADIP most accurately. For this reason, the delay time "dlyclock" of the delay circuit 50 should be adjusted in such a way that the formula "c=a−b" can hold based on the detection result of the phase comparators 65a and 65b.

In this manner, according to this embodiment, the optical disc apparatus 10 uses the phase comparators 65a and 65b to detect a phase difference between signals before input and after output to/from the path of HPF 46 and LPF 47 in case of supplying to the filter circuit 44 the wobble signal S1 obtained based on wobbling of the information track 2 of the optical disc 1 and a phase difference signals of the path of BPF 45, respectively. Then, the optical disc apparatus 10 adjusts the delay time "dlyclock" of the delay circuit 50 in such a way that the phases of these two paths can be in phase based on the detected phase differences. As a result, since ADIP can be optimally demodulated, it is possible to demodulate the ADIP information under the optimal status.

In particular, if the above detection and adjustment are periodically performed at a fixed timing, it is possible to always demodulate the ADIP information under the optimal status without any affection of drastic variation of power voltage and temperature. Also, since the reproduction speed varies in CAV (constant angular velocity) manner, the frequency of wobble signal accordingly varies, and thereby the optimal adjustment value may also vary. However, if the above-mentioned detection and adjustment are performed in transition from a reproduction operation in CAV to a recording operation, it is possible to demodulate the ADIP information under the optimal status.

Figure 14:
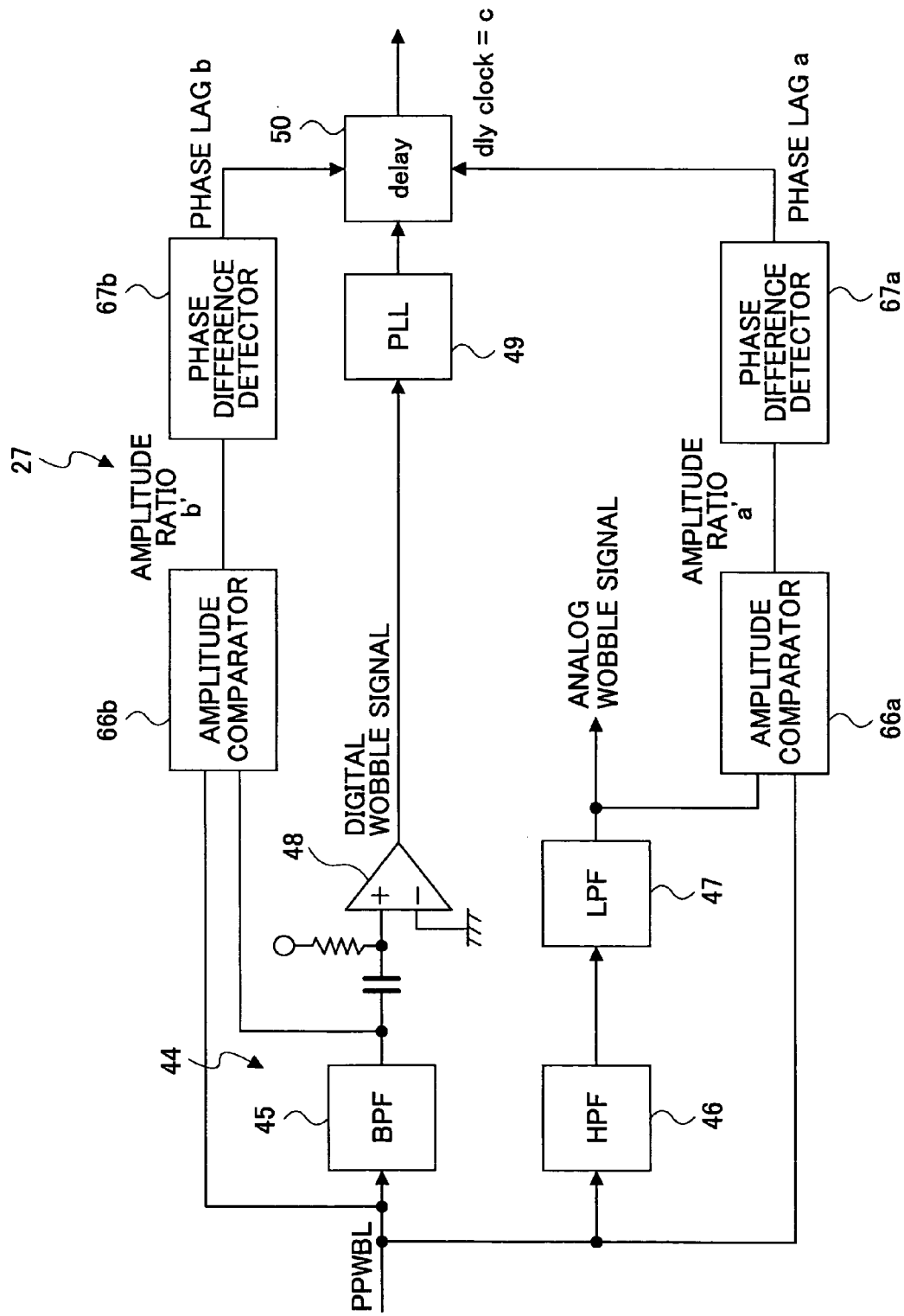
FIG. 14 is a schematic block diagram illustrating a selected portion of a wobble signal detection circuit according to another embodiment.

In this embodiment, the phase comparators 65a and 65b directly detect the phase differences between signals before input and after output of respective paths of the filter circuit 44. In another embodiment, for example, as illustrated in FIG. 14, when the wobble signal S1 based on the information track 2 is supplied, the amplitude comparator (amplitude ratio detection part) 66 a may detect an amplitude ratio "a'" (=output amplitude of HPF 46+LPF 47 path/input amplitude of HPF 46+LPF 47 path) of the amplitude of an output signal from the HPF 46+LPF 47 path to the amplitude of an input signal to the HPF 46+LPF 47 path, and the phase difference detector (phase difference detection part) 67a may detect a phase difference (phase lag) "a" based on the amplitude ratio "a'". On the other hand, the amplitude comparator (amplitude ratio detection part) 66b may detect an amplitude ratio "b'" (=output amplitude of BPF 45 path/input amplitude of BPF 45 path) of the amplitude of an output signal from the BPF 45 path to the amplitude of an input signal to the BPF 45 path, and the phase difference detector (phase difference detection part) 67b may detect a phase difference (phase lag) "b" based on the amplitude ratio "b'". Then, the delay time "timeset" of the delay circuit 64 may-be adjusted in such a way that the formula "a=b+c" can be satisfied based on the phase differences "a" and "b".

In this case, filter characteristics of LPF 47 and BPF 45 are measured in advance, and a relation between the amplitude ratio and the phase lag corresponding to the filter characteristics is written in a control program. The phase difference detectors 67a and 67b can use this relation to derive the phase differences "a" and "b" based on the amplitude ratios "a'" and "b'", respectively.

In FIG. 7 and other drawings, if the phase lag due to BPF 45 is represented as "b", the case where the phase lag "a" at the side of LPF 47 is greater than the phase lag "b" is illustrated. However, this embodiment is not limited to the above case. The other case, that is, the case where the phase lag "b" is greater than the phase lag "a", can be considered depending on the characteristics of BPF 45, HPF 46 and LPF 47. In this case, the phase of the digital wobble signal S4 should be shifted by the phase lag corresponding to "c=b−a" (that is, phase lead in this case).

Also, in this embodiment, the delay circuit 50 delays an output signal of BPF 45. Instead of this configuration, or in combination with this configuration, an output signal of LPF 47 may be supplied to a phase adjustment circuit to adjust the phase of the output signal. Alternatively, the phase difference between the output signal of LPF 47 and the output signal of BPF 45 may be directly computed, and the delay time "dlyclock" of the delay circuit 50 may be adjusted corresponding to the phase difference.

Figure 15:
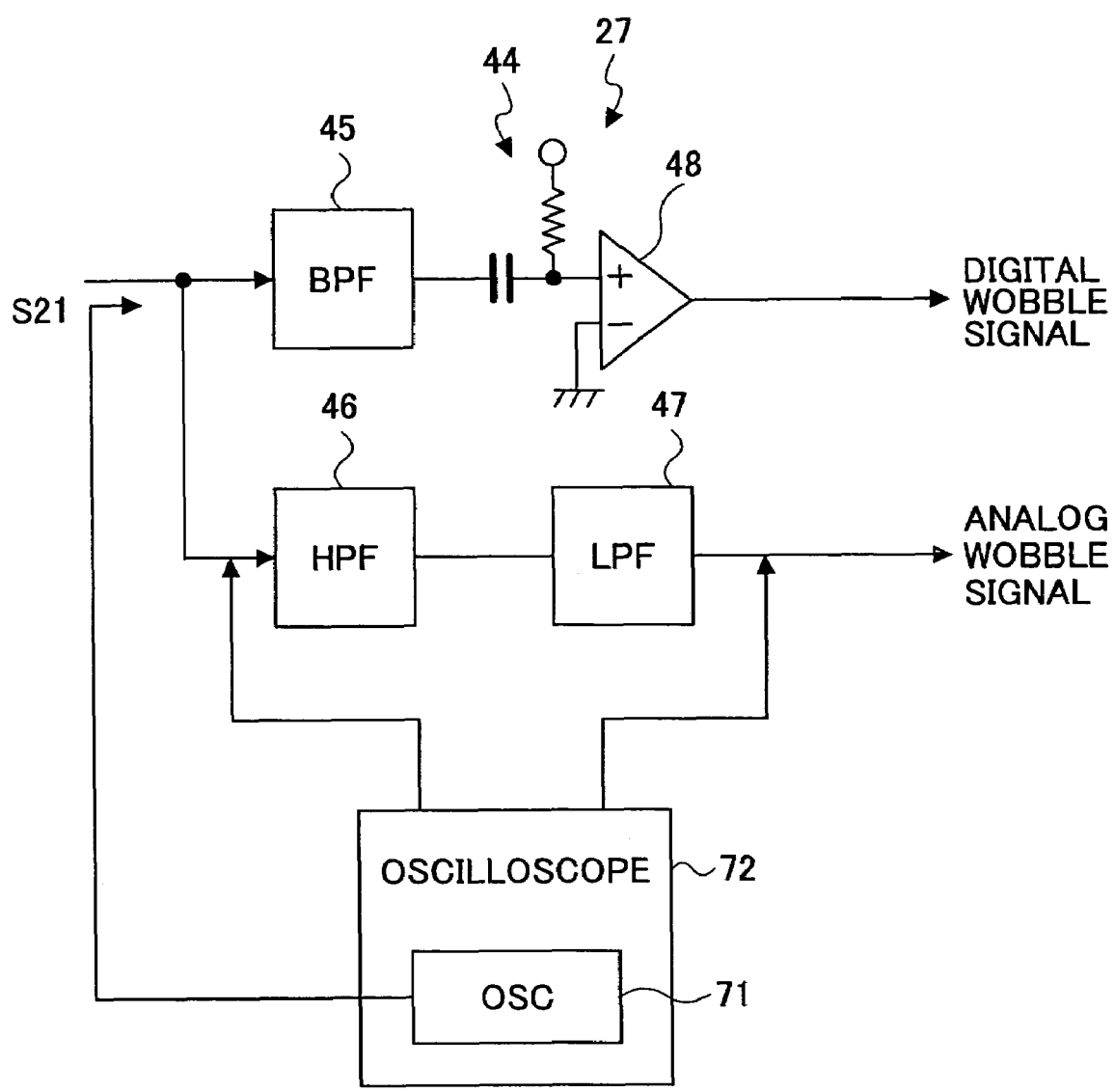
FIG. 15 is a schematic block diagram illustrating a selected portion of a wobble signal detection circuit.

In addition, in this embodiment, when the optical disc apparatus is fabricated or maintained, the optical disc apparatus may be additionally provided with an adjustment function to optimally adjust the recording start position. Referring to FIG. 15 illustrating a selected portion of the wobble signal detection circuit 27, in this embodiment, instead of the wobble signal S1, a sin wave S21 is supplied from an oscillator (alternative signal input part) 71 to the input side of the filter circuit 44 as an alternative signal (test signal) equivalent to the wobble signal S1 whose amplitude and frequency correspond to time of recording information, and for example, an oscilloscope (phase difference detection part) is used to observe the filter circuit 44 at this time, in this case, to measure the phase difference between signals before input and after output to/from the path of HPF 46 and LPF 47. The detected phase difference corresponds to the phase lag "a" shown in FIG. 7B.

On the other hand, a delay circuit 64 to adjust the phase of the synchronization signal ADIPsync=S11, which affects timing of the write timing signal S13, is disposed between the synchronization detector 61 and the encoder 14 of the optical disc apparatus 10, and the phase can be arbitrarily adjusted depending on setup of the delay time "timeset" (recording start position setting parameter) of the delay circuit 64. There is a proportionality relation, as illustrated in FIG. 9, between the phase difference between input and output signals of the path of HPF 46 and LPF 47 and the delay time "timeset".

Here, such a proportionality relation, as illustrated in FIG. 9, can be easily formed, for example, by recording a mirror disc during successively changing "timeset" by each one ECC and measuring a relevant portion through reproduction. If this proportionality relation is found in advance and the delay time "timeset" of the delay circuit 64 is adjusted depending on the phase difference detected by the oscilloscope (phase difference detection part) 72, it is possible to optimize the timing of the write timing signal S13.

Exemplary adjustment setup of recording timing based on the detected phase difference is described in detail by using an exemplary operation of actual recording time with reference to FIG. 10 showing a selected portion of FIG. 7. FIG. 10 is a waveform diagram illustrating an exemplary relation among the phase lag "a" of the path of HPF 46 and LPF 47 in the filter circuit 44, a delay amount "d" of the delay circuit 64 and the write timing signal S13.

The phase of the synchronization signal ADIPsync=S11 by the synchronization detector 61 is delayed by the phase lag "a" corresponding to the phase lag of the analog wobble signal S2 in the path of HPF 46 and LPF 47. The phase of the synchronization signal ADIPsync=S12 after delay processing by the delay circuit 64 is delayed by the delay amount "d" in "timeset". Also, it is supposed that there is a constant interval "e" as the phase relation between the synchronization signal ADIPsync=S12 and the write timing signal S13. In addition, the standard defines 93 periods of a wobble signal as one unit, and further arranges the write start timing at the position of "wbl#14+24T" ("wbl#14" represents the 15$^{th}$ period signal numbered from the phase modulation part "wbl#0", and the wobble one period is equal to "32T").

Here, "24T" represents "1T×24" of an RF signal, and for example, if the disc rotation rate is ×1, "1T" is approximately equal to 38.5 ns. If the disc rotation rate is ×2, "1T" is approximately equal to 19.2 ns, and if the disc rotation rate is ×4, "1T" is approximately equal to 9.6 ns, and so on. Here, as illustrated in FIG. 7, since the detected wobble signal is delayed by about one period relative to the actual wobble signal on the optical disc 1, the recording starts from the position "wbl#15+24T" on the optical disc 1 ("#15" means this fact).

In this case,
If $$a + d + e = wbl\ 16\ \text{period} + 24\ \text{bit}$$
$$= 16 \times 32T + 24T,$$

then it can be concluded that the write timing signal complies with the standard. Thus, the delay time "timeset" should be adjusted in such a way that the following formula can hold:

$$d = 16 \times 32T + 24T - a - e.$$

In this manner, according to this embodiment, the optical disc apparatus 10 uses the oscillator 71 to supply to the input side of the filter circuit 44 the sin wave S21 whose amplitude and frequency are equivalent to those of the wobble signal. At this time, the oscilloscope 72 detects the phase difference between signals before input and after output to/from the path of HPF 46 and LPF 47, and the delay time "timeset" of the delay circuit 64 is adjusted depending on the detected phase difference. As a result, since the timing of the write timing signal can be optimized, it is possible to easily and properly optimize the recording start position without performing any actual recording/reproduction operation on each optical disc apparatus 10. This can be easily implemented only by means of the oscillator 71 and the oscilloscope 72.

In another embodiment, although not especially illustrated, instead of the oscillator 71 and the oscilloscope 72, a gain phase analyzer may be used as the alternative signal input part and the phase difference detection part. Specifically, the gain phase analyzer supplies a sin wave, of which amplitude is equivalent to that of the wobble signal, to the input side of the filter circuit 44 as an alternative signal while sweeping of the frequency thereof, and measures frequency characteristics on an output relative to an input of HPF 46+LPF 47. In this case, the frequency characteristics mean "horizontal axis: frequency; and vertical axis: gain and phase". Then, the phase lag in case of the frequency being equivalent to that of the wobble signal is derived, and the derived phase lag is set to the above-mentioned "a".

In this manner, if the gain phase analyzer is used, it is possible to not only easily implement the invention but also examine the characteristics of HPF 46+LPF 47.

Also, in this embodiment, the oscilloscope 72 and the gain phase analyzer can be used to detect the phase difference between signals before input and after output to/from the HPF 46+LPF 47 path. In another embodiment, the phase difference between signals before input and after output to/from BPF 45 may be detected, and the delay amount "timeset" of the delay circuit 64 may be adjusted depending on the detected phase difference. In this case, the phase of an analog wobble signal is adjusted in synchronization with that of a digital wobble signal.

Figure 16:
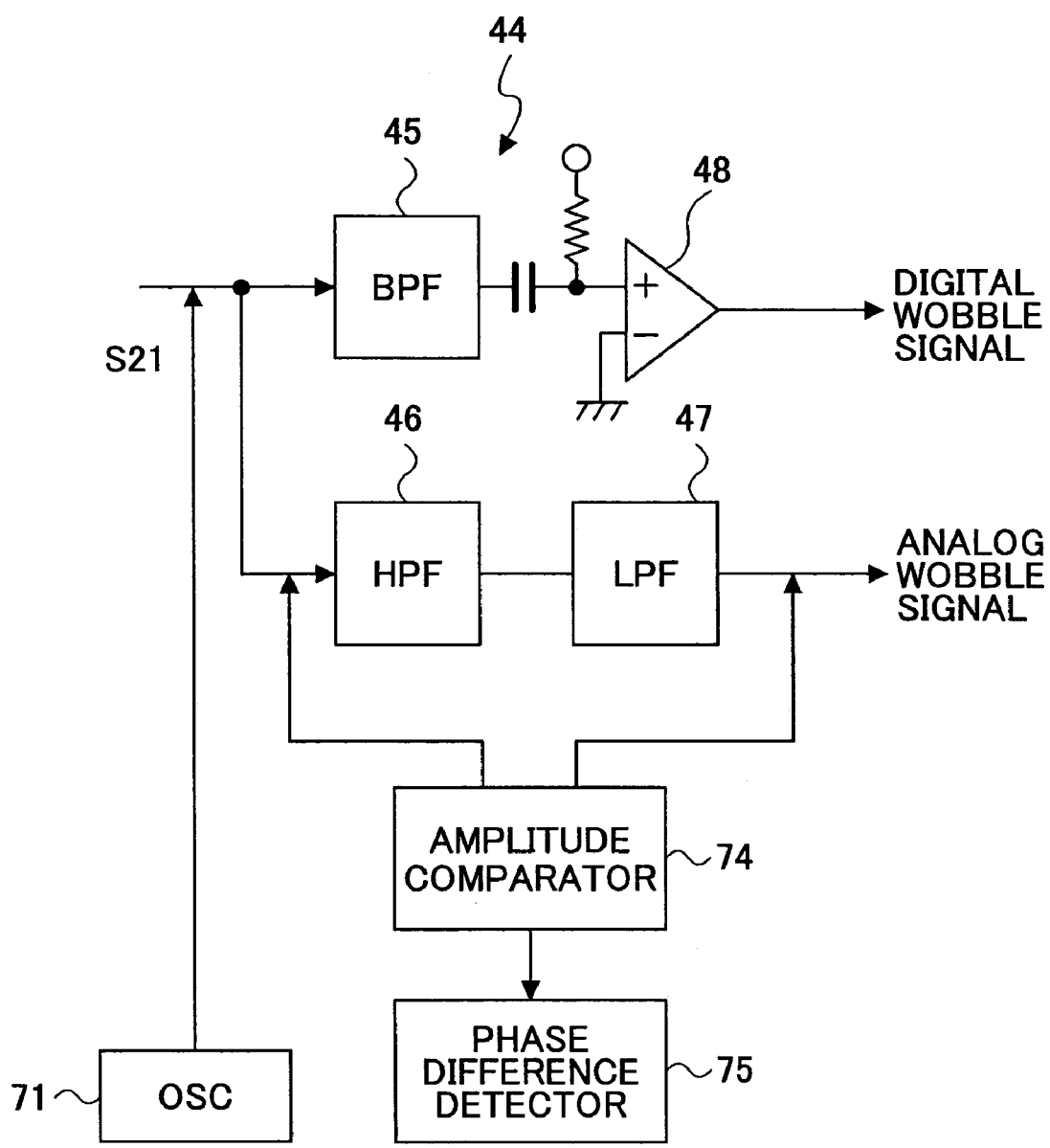
FIG. 16 is a schematic block diagram illustrating an exemplary structure of another embodiment on a substitute signal input part and a phase difference detection part.

In addition, in this embodiment, the phase difference between signals before input and after output to/from the filter circuit 44 is directly detected. However, in another embodiment, for example, as illustrated in FIG. 16, the amplitude comparator (amplitude ratio detection part) 74 may detect an amplitude ratio "a'" (=output amplitude of HPF 46+LPF 47 path/input amplitude of HPF 46+LPF 47 path) of the amplitude of an output signal from HPF 46+LPF 47 path to the amplitude of an input signal to HPF 46+LPF 47 path in case of supplying an alternative signal such as the sin wave S21, and the phase difference detector (phase difference detection part) 75 may detect the phase difference (phase lag) "a" based on the amplitude ratio "a'", and then the delay time "timeset" of the delay circuit 64 may be adjusted.

In this case, filter characteristics of LPF 47 are measured in advance, and a relation between the amplitude ratio corresponding to the filter characteristics and the phase lag is written in a control program. Then, the phase difference detector 75 may use the relation to compute the phase difference "a" based on the amplitude ratio "a'".

Figure 17:
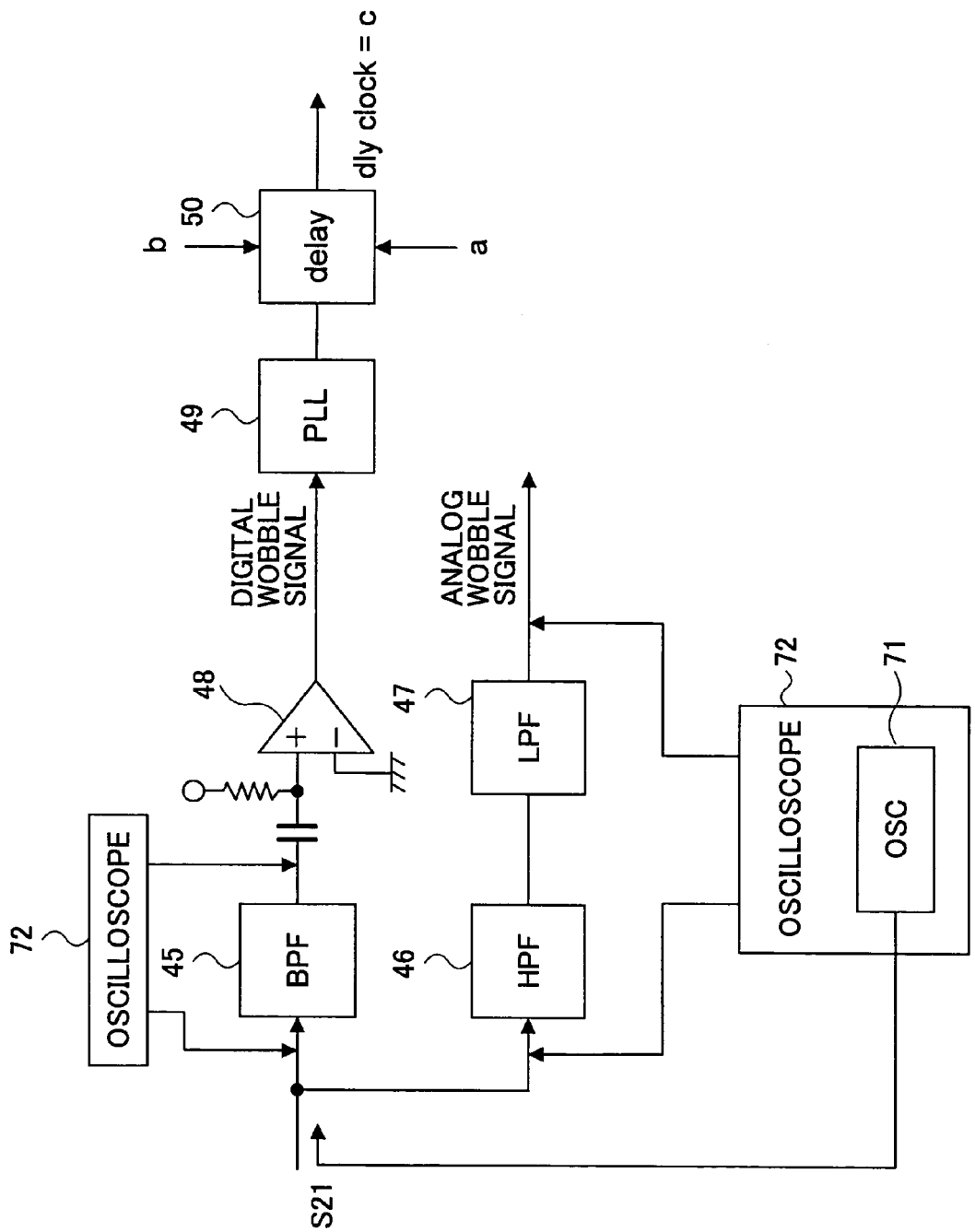
FIG. 17 is a schematic block diagram illustrating a selected portion of a wobble signal detection circuit according to another embodiment of the present invention.

Another embodiment of the present invention is described with reference to FIG. 13 and FIG. 17. In this embodiment, the optical disc apparatus 10 is additionally provided with an adjustment function to eliminate poor demodulation characteristics of the ADIP information due to phase differences in fabrication and maintenance of the optical disc apparatus 10. In FIG. 17, only a relevant portion in the wobble signal detection circuit 27 is illustrated.

In this embodiment, instead of the wobble signal S1, the sin wave S21 is supplied from, for example, an oscillator (alternative signal input part) to the input side of the filter circuit 44 as an alternative signal (test signal) equivalent to the wobble signal S1 whose amplitude and frequency correspond to time of recording information. At this time, for example, the oscilloscope (phase difference detection part) 72 measures the phase difference "a" between signals before input and after output to/from HPF 46+LPF 47 path, and at the same time, for example, the oscilloscope (phase difference detection part) 72 measures the phase difference "b" between signals before input and after output to/from BPF 45 path. Based on these measured results, the delay time "dlyclock" of the delay circuit 50, which serves as an adjustment part disposed after the PLL circuit 49, is adjusted in such a way that the phases of the two paths can coincide.

FIG. 13 is a waveform diagram illustrating an exemplary relation among the phase of the wobble signal S1 before filtering, the phase of the analog wobble signal S2 passing through LPF 47, and the phase of the digital wobble signal S3 passing through BPF 45 (before digitalization by the digitizer circuit 48).

In HPF 46+LPF 47 path, the phase of the analog wobble signal S2 is delayed by "a". In BPF 45 path, the phase of the digital wobble signal S3 is delayed by "b". Then, before the sin wave generation circuit 51 generates a sin wave-shaped digital wobble signal, the delay time "dlyclock" set in the delay circuit 50 causes phase lag corresponding to "c" (see FIG. 7). Here, since the multiplier 53 multiplies the sin wave=S6 by the analog wobble signal S2 in ADIP demodulation, it can be concluded that as the amplitude after the multiplication is higher, the ADIP information can be demodulated better. In order to do so, it is required that the phase relation between the sin wave and the analog wobble signal be in phase.

Thus, if a=b+c, the phase relation between the analog wobble signal and the digital wobble signal can be nearly in phase, and thereby ADIP can be demodulated most accurately. Based on the measurement result, the delay time "dlyclock" of the delay circuit 50 should be adjusted in such a way that c=a−b.

In this manner, according to this embodiment, the optical disc apparatus 10 uses the oscillator 71 to supply the sin wave S21, of which amplitude and frequency are equivalent to those of the wobble signal, to the input side of the filter circuit 44. At this time, the oscilloscope 72 detects the phase difference between signals before input and after output to/from HPF 46+LPF 47 path, and based on the detected phase difference, the delay time "dlyclock" of the delay circuit 50 is adjusted in such a way that the phases of the two paths can be in phase. As a result, since ADIP can be optimally demodulated, it is possible to always demodulate ADIP with the optimal delay time "dlyclock" without any actual recording/reproduction operation on each optical disc apparatus 10. This can be easily implemented only by means of the oscillator 71 and the oscilloscope 72.

Also in this case, instead of the oscillator 71 and the oscilloscope 72, a gain phase analyzer may be used. Alternatively, like the example illustrated in FIG. 16, an amplitude ratio of signals before input and after output to/from the filter circuit 44 may be detected for the respective paths, and the respective phase differences may be detected based on the detected amplitude ratio. Based on the phase differences, the delay time "dlyclock" of the delay circuit 50 may be adjusted in the above-mentioned way.

In this embodiment, the output signal of BPF 45 is delayed by the delay circuit 50. Instead of such a configuration, or in combination with such a configuration, the output signal of LPF 47 may be supplied to a phase adjustment circuit to adjust the phase thereof.

Figure 18:
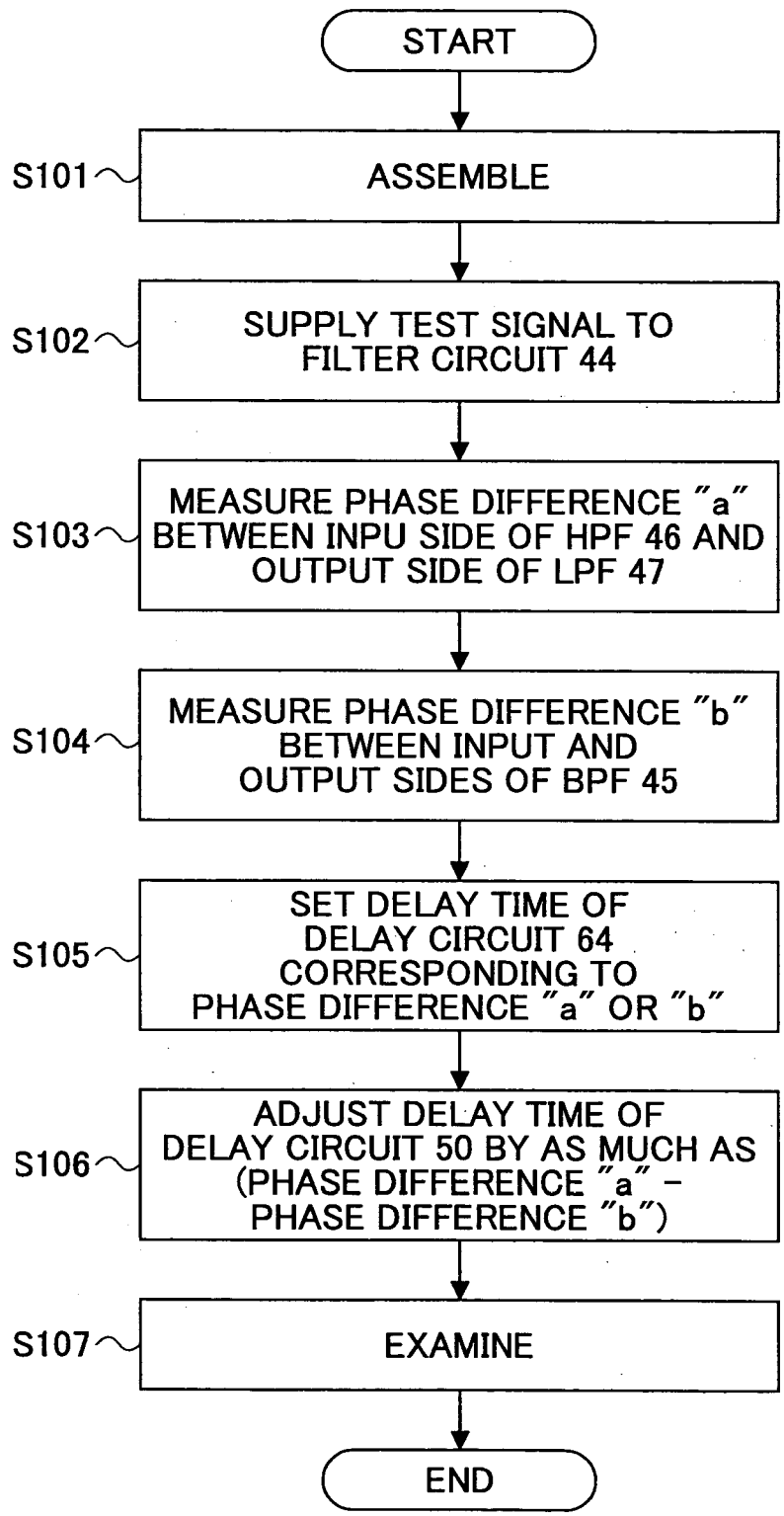
FIG. 18 is a schematic flowchart illustrating a fabrication method of an optical disc apparatus.

FIG. 18 is a flowchart of an exemplary method of fabricating the optical disc apparatus 10 including a step of adjusting delay time of the delay circuits 50 and 64. In this fabrication step, as an assembling step, components, such as the filter circuit 44, the multiplier 53, the delay circuits 50 and 64, the ADIP information detector, the synchronization detector 61 and the encoder 4, are installed into a housing (not illustrated) (S101).

After completion of the assembling, the control moves to an adjustment step of arranging the assembled components. A description herein is focused on the adjustment step of the delay time according to the present invention. The above-mentioned test signal is supplied to BPF 45 and HPF 46 as the filter circuit 44 (S102).

In the status where the test signal is supplied, the phase difference "a" between the test signal incoming to HPF 46 and the test signal outgoing from LPF 45 is measured and detected (S103). In addition, the phase difference "b" between the test signal incoming to BPF 45 and the test signal outgoing from BPF 45 is measured and detected (S104). The measurement and detection method for these phase differences follows the above-mentioned method.

Then, the delay circuit 64 is adjusted as much as the delay time "timeset" corresponding to the phase difference "a" (or the phase difference "b") (S105). Thereby, it is possible to adjust a recording timing difference. Also, the delay time "dlyclock" of the delay circuit 50 is adjusted in such a way that a phase difference corresponding to (phase difference "a"–phase difference "b") can occur (S106). Thereby, it is possible to accurately obtain the ADIP information.

It is noted that adjustment of emission power of a semiconductor laser (gain adjustment) and other adjustment are conducted in this adjustment step.

After completion of the adjustment step, the control moves to an examination step, and it is checked whether the optical disc apparatus 10 can operate properly through various well-known examination methods. After completion of the examination step, the fabrication of the optical disc apparatus 10 is completed.

Here, if the delay time of the delay circuit 50 is not adjusted, either of step S106 or steps S103 and S104 can be omitted. Also, if the delay time of the delay circuit 64 is not adjusted, step S105 can be omitted. In addition, instead of step S106, the phase difference between the output signal of LPF 7 and the output signal of BPF 45 is computed, and the delay time "dlyclock" of the delay circuit 50 may be adjusted as much as the phase difference.

Here, the phase lag by BPF 45 is supposed as "b". In FIG. 7, the case where the phase lag "a" at the side of LPF 47 is greater than the phase lag "b" is illustrated. However, the present invention is not limited to this case, and depending on characteristics of BPF 45, HPF 46 and LPF 47, the other case, that is, the case where the phase lag "b" is greater than the phase lag "a", can be considered. In such a case, the phase of the digital wobble signal S4 should be shifted as much as the phase difference of "c=b−a" (that is, phase lead in this case).

Also, in the above description, the exemplary adjustment of adjusting the delay time through manual manipulation by using the oscilloscope 72 and the gain phase analyzer has been described. However, the present invention is not limited to this method.

Figure 19:
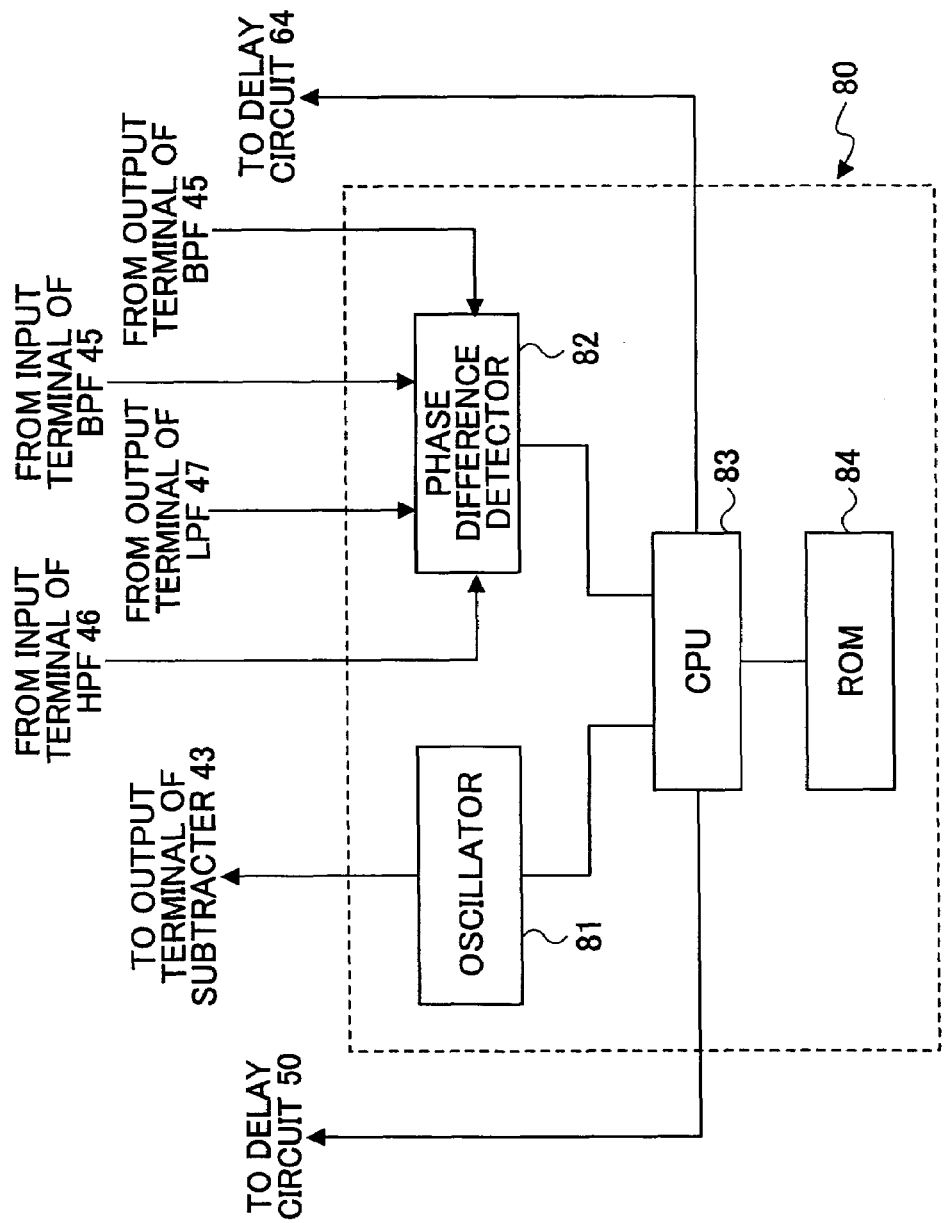
FIG. 19 is a schematic block diagram illustrating an exemplary structure of an adjustment dedicated apparatus.
Figure 20:
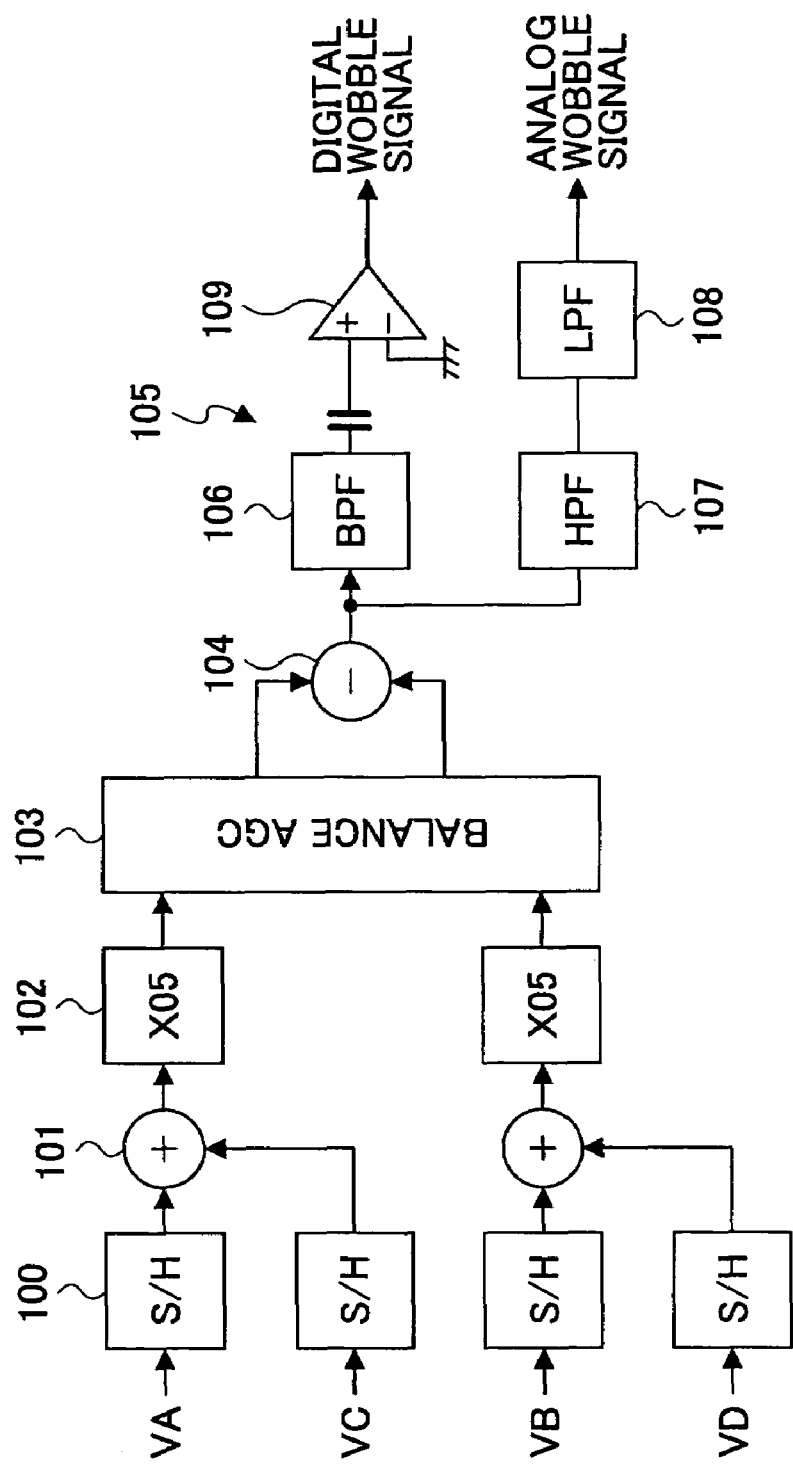
FIG. 20 is a schematic block diagram illustrating an exemplary structure of a portion of a conventional wobble signal detection circuit.
Figure 23A:
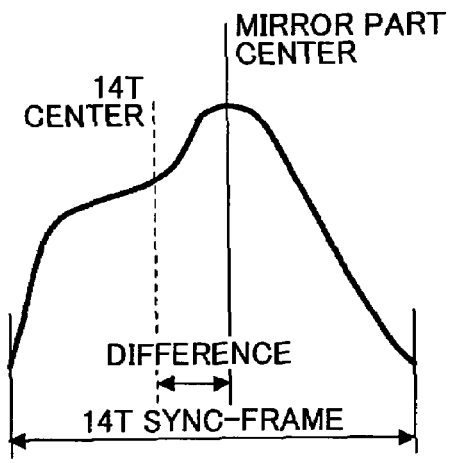
FIGS. 23A and 23B are explanatory diagrams illustrating an aspect of RF signal waveform.
Figure 23B:
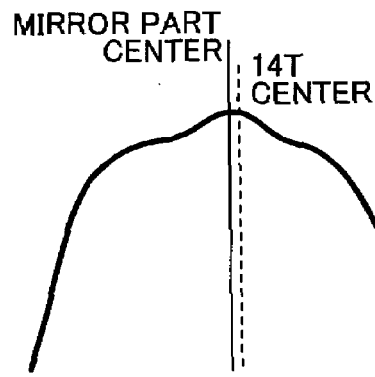
Figure 24:
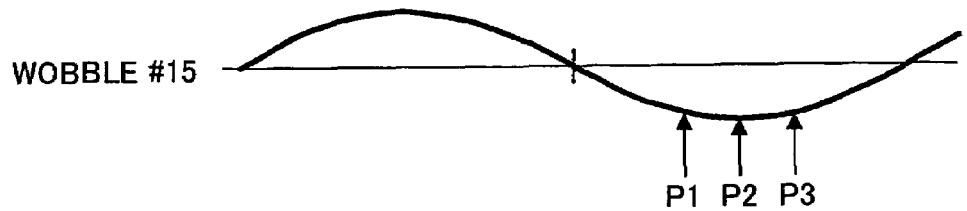
FIG. 24 is a waveform diagram illustrating exemplary adjustment operation.

Specifically, as illustrated in FIG. 19, an adjustment dedicated machine 80 may be configured to include an oscillator 81 to generate a test signal, a phase difference detection apparatus 82 having a phase difference detection function, which is a function of the oscilloscope 72, CPU 83 to control these components, and ROM 84 to store programs to cause CPU 83 to execute predefined control processes, and the delay time of the delay circuit 50 or 64 may be automatically adjusted corresponding to the detected phase difference.

Alternatively, an adjustment dedicated machine 80 may be configured to include an oscillator 81 to generate a test signal, a phase difference detection apparatus 82 having an amplitude comparator 74 and a phase detector 75, CPU 83 to control these components, and ROM 84 to store programs to cause CPU 83 to execute predefined control processes, and the delay time of the delay circuit 50 or 64 may be automatically adjusted corresponding to the detected phase difference.

In these cases, CPU 83 executes instructions to individual components corresponding to various processes (steps S102 to S106 shown in FIG. 18), which have been manually performed, in accordance with programs stored in ROM 84 of the apparatus. Specifically, CPU 83 instructs the oscillator 81 to generate a predetermined test signal (S102).

In response to the instruction, the oscillator 81 supplies the test signal to the filter circuit 44. Then, CPU 83 instructs the phase difference detection apparatus 82 to detect the phase difference "a" between test signals at the input side to HPF 46 and the output side from LPF 47 and the phase difference "b" between test signals incoming to and outgoing from BPF 45 (S103, S104). In response to this instruction, the phase difference detection apparatus 82 detects the phase differences "a" and "b".

CPU 83 supplies the delay time "timeset" corresponding to the phase difference "a" (or the phase difference "b") to the delay circuit 64 (S105). In addition, CPU 83 supplies the delay time "dlyclock" as much as the phase difference corresponding to (phase difference "a"–phase difference "b") to the delay circuit 50 (S107). Through this process, it is possible to reduce effect due to the phase difference of a wobble signal by the filter circuit 44.

Here, if the delay time of the delay circuit 50 is not adjusted, CPU 83 can omit either of step S106 or steps S103 and S104. Also, if the delay time of the delay circuit 64 is not adjusted, CPU 83 can omit step S105. In addition, instead of step S106, CPU 83 may compute a phase difference between the output signal of LPF 7 and the output signal of BPF 45, and adjust the delay time "dlyclock" of the delay circuit 50 as much as the phase difference.

The present invention is not limited to the specifically disclosed embodiments, and variations and modifications may be made without departing from the scope of the present invention.

What is claimed is:

1. An optical disc apparatus for recording information by illuminating light to an information recording medium having an information track wobbled at a constant period wherein the optical disc apparatus includes a wobble signal detection circuit having a filter circuit, and the wobble signal detection circuit detects a wobble signal based on wobbling of the information track and demodulates ADIP information, the apparatus comprising:
a phase difference detection part detecting a phase difference between input and output signals to/from the filter circuit to which the wobble signal is supplied; and
an adjustment part adjusting a phase of a recording start timing signal synchronized with a synchronization signal included in the ADIP information corresponding to the detected phase difference.

2. The optical disc apparatus as claimed in claim 1, further comprising:
an amplitude ratio detection part detecting an amplitude ratio between the input and output signals to/from the filter circuit to which the wobble signal is supplied,
wherein the phase difference detection part detects the phase difference between the input and output signals to/from the filter circuit based on the detected amplitude ratio.

3. The optical disc apparatus as claimed in claim 1, wherein the adjustment part adjusts the phase of the recording start timing signal by delaying a phase of the synchronization signal corresponding to the detected phase difference.

4. The optical disc apparatus as claimed in claim 1, wherein the filter circuit comprises a first path via which the wobble signal passes through a band pass filter and a second path via which the wobble signal passes through a high pass filter and a low pass filter, and the phase difference detection part detects a phase difference between input and output signals to/from the second path.

5. The optical disc apparatus as claimed in claim 1, wherein the filter circuit comprises a first path via which the wobble signal passes through a band pass filter and a second path via which the wobble signal passes through a high pass filter and a low pass filter, and the phase difference detection part detects a phase difference between input and output signals to/from the first path.

6. An optical disc apparatus for recording information by illuminating light to an information recording medium having an information track wobbled at a constant period wherein the optical disc apparatus includes a wobble signal detection circuit having a filter circuit, and the wobble signal detection circuit detects a wobble signal based on wobbling of the information track and demodulates ADIP information, the apparatus comprising:
a first path via which the wobble signal passes through a band pass filter;
a second path via which the wobble signal passes through a high pass filter and a low pass filter;
a phase difference detection part detecting a phase difference between input and output signals to/from the first path to which the wobble signal is supplied and a phase difference between input and output signals to/from the second path to which the wobble signal is supplied; and
an adjustment part performing phase adjustment corresponding to the detected phase differences such that a phase of the first path matches a phase of the second path.

7. The optical disc apparatus as claimed in claim 6, further comprising:
an amplitude ratio detection part detecting an amplitude ratio between input and output signals to/from the first path to which the wobble signal is supplied and an amplitude ratio between input and output signals to/from the second path to which the wobble signal is supplied,
wherein the phase difference detection part detects the respective phase differences between the input and output signals based on the detected amplitude ratios.

8. The optical disc apparatus as claimed in claim 6, wherein the phase difference detection part executes a detection operation for each constant timing.

9. The optical disc apparatus as claimed in claim 6, wherein the phase difference detection part executes a detection operation in transition from a reproduction operation to a recording operation in CAV.

10. An information recording method of recording information in an information recording medium by using an optical disc apparatus having a wobble signal detection circuit with a filter circuit, said wobble signal detection circuit illuminating light to the information recording medium having an information track wobbled at a constant period, detecting a wobble signal based on wobbling of the wobbled information track, and demodulating ADIP information, the method comprising:
a signal input step of obtaining the wobble signal based on the wobbling of the information track of the information recording medium and supplying the obtained wobble signal to the filter circuit;
a phase difference detection step of detecting a phase difference between input and output signals to/from the filter circuit to which the wobble signal is supplied; and
an adjustment step of adjusting a phase of a recording start timing signal synchronized with a synchronization signal included in the ADIP information corresponding to the detected phase difference.

11. The information recording method as claimed in claim 10, further comprising:
an amplitude ratio detection step of detecting an amplitude ratio between the input and output signals to/from the filter circuit to which the wobble signal is supplied,
wherein the phase difference detection step comprises detecting the phase difference between the input and output signals to/from the filter circuit based on the detected amplitude ratio.

12. The information recording method as claimed in claim 10, wherein the adjustment step comprises adjusting the phase of the recording start timing signal by delaying a phase of the synchronization signal corresponding to the detected phase difference.

13. The information recording method as claimed in claim 10, wherein by using the filter circuit comprising a first path via which the wobble signal passes through a band pass filter and a second path via which the wobble signal passes through a high pass filter and a low pass filter, the phase difference detection step detects a phase difference between input and output signals to/from the second path.

14. The information recording method as claimed in claim 10, wherein by using the filter circuit comprising a first path via which the wobble signal passes through a band pass filter and a second path via which the wobble signal passes through a high pass filter and a low pass filter, the phase difference detection step detects a phase difference between input and output signals to/from the first path.

15. An information recording method of recording information in an information recording medium by using an optical disc apparatus having a wobble signal detection circuit with a filter circuit, said wobble signal detection circuit illuminating light to the information recording medium having an information track wobbled at a constant period, detecting a wobble signal based on wobbling of the wobbled information track, and demodulating ADIP information, the method comprising:

by using the filter circuit having a first path via which the wobble signal passes through a band pass filter and a second path via which the wobble signal passes through a high pass filter and a low pass filter, a phase difference detection step of detecting a phase difference between input and output signals to/from the first path to which the wobble signal is supplied and a phase difference between input and output signals to/from the second path to which the wobble signal is supplied; and an adjustment step of performing phase adjustment corresponding to the detected phase differences such that a phase of the first path matches a phase of the second path.

16. The information recording method as claimed in claim 15, further comprising:

an amplitude ratio detection step of detecting an amplitude ratio between the input and output signals to/from the first path to which the wobble signal is supplied and an amplitude ratio between the input and output signals to/from the second path, wherein the phase difference detection step comprises detecting the respective phase differences between the input and output signals based on the detected amplitude ratios.

17. The information recording method as claimed in claim 15, wherein the phase difference detection step comprises executing a detection operation for each constant timing.

18. The information recording method as claimed in claim 15, wherein the phase difference detection step comprises executing a detection operation in transition from a reproduction operation to a recording operation in CAV.

19. An optical disc apparatus for recording information in an information recording medium wherein the optical disc apparatus includes an optical pickup illuminating light to the information recording medium having an information track wobbled at a constant period, receiving light reflected from the information recording medium and generating a light receiver signal corresponding to an amount of the received light, a filter circuit removing noise from a wobble signal based on wobbling of the information track from the light receiver signal, a synchronization detector detecting a synchronization signal included in the wobble signal, an encoder determining a recording start timing based on the synchronization signal, and a phase adjustment circuit shifting a phase of the synchronization signal and supplying the resulting synchronization signal to the encoder, the apparatus comprising:

a phase comparison part comparing an output signal from the filter circuit with an input signal to the filter circuit; and a phase shift amount adjustment part adjusting a shift amount of the phase of the synchronization signal shifted by the phase adjustment circuit based on the comparison.

20. An optical disc apparatus including an optical pickup illuminating light to an information recording medium having an information track wobbled at a constant period, receiving light reflected from the information recording medium and generating a light receiver signal corresponding to an amount of the received light, a first filter circuit removing noise from a wobble signal based on wobbling of the information track from the light receiver signal, a second filter circuit extracting a frequency component around a fundamental frequency component of the wobble signal based on the wobbling of the information track from the light receiver signal, a multiplier multiplying an output signal from the first filter circuit by an output signal from the second filter circuit, a phase adjustment circuit adjusting a phase difference of the two signals supplied to the multiplier, and an information detection circuit detecting information included in the wobble signal based on an output signal from the multiplier, the apparatus comprising:

a phase difference acquisition part acquiring the phase difference between the output signal from the first filter circuit and the output signal from the second filter circuit; and a phase difference adjustment part adjusting the phase difference between the two signals supplied to the multiplier by the phase adjustment circuit based on the phase difference acquired by the phase difference acquisition part.

21. The optical disc apparatus as claimed in claim 20, wherein the phase difference acquisition part comprises:

a first phase difference acquisition part acquiring a phase difference between input and output signals to/from the first filter circuit; and a second phase difference acquisition part acquiring a phase difference between input and output signals to/from the second filter circuit.

22. An adjustment apparatus for an optical disc apparatus recoding information by illuminating light to an information recoding medium having an information track wobbled at a constant period wherein the optical disc apparatus includes a wobble signal detection circuit having a filter circuit and said wobble signal detection circuit detects a wobble signal based on wobbling of the information track, the apparatus comprising:

an alternative signal input part supplying an alternative signal to the wobble signal to an input side of the filter circuit;

a phase difference detection part detecting a phase difference between input and output signals to/from the filter circuit to which the alternative signal is supplied; and an adjustment part adjusting a phase of a recording start timing signal determined based on the wobble signal corresponding to the detected phase difference.

23. The adjustment apparatus as claimed in claim 22, wherein the alternative signal input part comprises an oscillator supplying a sin wave having amplitude and frequency equivalent to the wobble signal as an alternative signal, and the phase difference detection part comprises an oscilloscope.

24. The adjustment apparatus as claimed in claim 22, wherein the alternative signal input part and the phase difference detection part comprises a gain phase analyzer supplying the alternative signal, while sweeping frequency thereof with a sin wave having an amplitude equivalent to the wobble signal, and detecting the phase difference during the frequency being equivalent to the wobble signal.

25. The adjustment apparatus as claimed in claim 22, further comprising:
an amplitude ratio detection part detecting an amplitude ratio between the input and output signals to/from the filter circuit to which the alternative signal is supplied,
wherein the phase difference detection part detects the phase difference between the input and output signals to/from the filter circuit based on the detected amplitude ratio.

26. The adjustment apparatus as claimed in claim 22, wherein the adjustment part adjusts the phase of the recording start timing signal by delaying a phase of a synchronization signal generated by the wobble signal detection circuit based on the wobble signal corresponding to the detected phase difference.

27. The adjustment apparatus as claimed in claim 22, wherein the filter circuit comprises a first path via which the wobble signal passes through a band pass filter and a second path via which the wobble signal passes through a high pass filter and a low pass filter, and the phase difference detection part detects a phase difference between input and output signals to/from the second path.

28. The adjustment apparatus as claimed in claim 22, wherein the filter circuit comprises a first path via which the wobble signal passes through a band pass filter and a second path via which the wobble signal passes through a high pass filter and a low pass filter, and the phase difference detection part detects a phase difference between input and output signals to/from the first path.

29. The adjustment apparatus as claimed in claim 22, wherein the filter circuit comprises a first path via which the wobble signal passes through a band pass filter and a second path via which the wobble signal passes through a high pass filter and a low pass filter, the phase difference detection part detects the phase difference between the input and output signals to/from the first path and the phase difference between the input and output signals to/from the second path, and the adjustment part performs phase adjustment such that a phase of the first path matches a phase of the second phase.

30. An adjustment method for an optical disc apparatus recoding information by illuminating light to an information recoding medium having an information track wobbled at a constant period wherein the optical disc apparatus includes a wobble signal detection circuit having a filter circuit and said wobble signal detection circuit detects a wobble signal based on wobbling of the information track, the method comprising:
an alternative signal input step of supplying an alternative signal to the wobble signal to an input side of the filter circuit;
a phase difference detection step of detecting a phase difference between input and output signals to/from the filter circuit to which the alternative signal is supplied; and
an adjustment step of adjusting a phase of a recording start timing signal determined based on the wobble signal corresponding to the detected phase difference.

31. The adjustment method as claimed in claim 30, wherein the alternative signal input step uses an oscillator supplying a sin wave having amplitude and frequency equivalent to the wobble signal as an alternative signal, and the phase difference detection step uses an oscilloscope.

32. The adjustment method as claimed in claim 30, wherein the alternative signal input step and the phase difference detection step use a gain phase analyzer supplying the alternative signal, while sweeping frequency thereof with a sin wave having an amplitude equivalent to the wobble signal, and detecting the phase difference during the frequency being equivalent to the wobble signal.

33. The adjustment method as claimed in claim 30, further comprising:
an amplitude ratio detection step of detecting an amplitude ratio between the input and output signals to/from the filter circuit to which the alternative signal is supplied,
wherein the phase difference detection step comprises detecting the phase difference between the input and output signals to/from the filter circuit based on the detected amplitude ratio.

34. The adjustment method as claimed in claim 30, wherein the adjustment step comprises adjusting the phase of the recording start timing signal by delaying a phase of a synchronization signal generated by the wobble signal detection circuit based on the wobble signal corresponding to the detected phase difference.

35. The adjustment method as claimed in claim 30, wherein the filter circuit comprises a first path via which the wobble signal passes through a band pass filter and a second path via which the wobble signal passes through a high pass filter and a low pass filter, and the phase difference detection step comprises detecting a phase difference between input and output signals to/from the second path.

36. The adjustment method as claimed in claim 30, wherein the filter circuit comprises a first path via which the wobble signal passes through a band pass filter and a second path via which the wobble signal passes through a high pass filter and a low pass filter, and the phase difference detection step comprises detecting a phase difference between input and output signals to/from the first path.

37. The adjustment method as claimed in claim 30, wherein the filter circuit comprises a first path via which the wobble signal passes through a band pass filter and a second path via which the wobble signal passes through a high pass filter and a low pass filter, the phase difference detection step comprises detecting the phase difference between the input and output signals to/from the first path and the phase difference between the input and output signals to/from the second path, and the adjustment step comprises performing phase adjustment such that a phase of the first path matches a phase of the second phase.

38. A fabrication method for an optical disc apparatus for recording information in an information recording medium wherein the optical disc apparatus includes an optical pickup illuminating light to the information recording medium having an information track wobbled at a constant period, receiving light reflected from the information recording medium and generating a light receiver signal corresponding to an amount of the received light, a filter circuit removing noise from a wobble signal based on wobbling of the information track from the light receiver signal, a synchronization detector detecting a synchronization signal included in the wobble signal, an encoder determining a recording start timing based on the synchronization signal, and a phase adjustment circuit shifting a phase of the synchronization signal and supplying the resulting synchronization signal to the encoder, the method comprising steps of:
supplying to the filter circuit a test signal having the same frequency as a fundamental frequency component of the wobble signal extracted at information recording time;

comparing a phase difference between a test signal outgoing from the filter circuit and the test signal supplying to the filter circuit; and adjusting an amount of the phase shift by the phase adjustment circuit based on the comparison.

39. A fabrication method for an optical disc apparatus including an optical pickup illuminating light to an information recording medium having an information track wobbled at a constant period, receiving light reflected from the information recording medium and generating a light receiver signal corresponding to an amount of the received light, a first filter circuit removing noise from a wobble signal based on wobbling of the information track from the light receiver signal, a second filter circuit extracting a frequency component around a fundamental frequency component of the wobble signal based on the wobbling of the information track from the light receiver signal, a multiplier multiplying an output signal from the first filter circuit by an output signal from the second filter circuit, a phase adjustment circuit adjusting a phase difference of the two signals supplied to the multiplier, and an information detection circuit detecting information included in the wobble signal based on an output signal from the multiplier, the method comprising steps of:

supplying a test signal having the same frequency as a fundamental frequency component of the wobble signal extracted at information recording time to the first filter circuit and the second filter circuit;

acquiring a phase difference between a test signal outgoing from the first filter circuit and a test signal outgoing from the second filter circuit; and adjusting the phase difference between the two signals supplied to the multiplier by the phase adjustment circuit based on the phase difference acquired at the phase difference acquisition step.

40. The fabrication method as claimed in claim 39, wherein the phase difference acquisition step comprises:

a first phase difference acquisition step of acquiring a phase difference between a test signal outgoing from the first filter circuit and a test signal supplied to the first filter circuit; and a second phase difference acquisition step of acquiring a phase difference between a test signal outgoing from the second filter circuit and a test signal supplied to the second filter circuit.

41. A phase shift amount adjustment method of adjusting a phase shift amount for an optical disc apparatus including an optical pickup illuminating light to the information recording medium having an information track wobbled at a constant period, receiving light reflected from the information recording medium and generating a light receiver signal corresponding to an amount of the received light, a filter circuit removing noise from a wobble signal based on wobbling of the information track from the light receiver signal, a synchronization detector detecting a synchronization signal included in the wobble signal, an encoder determining a recording start timing based on the synchronization signal, and a phase adjustment circuit shifting a phase of the synchronization signal and supplying the resulting synchronization signal to the encoder, the method comprising steps of:

supplying to the filter circuit a test signal having the same frequency as a fundamental frequency component of the wobble signal extracted at information recording time;

comparing a phase difference between a test signal outgoing from the filter circuit and the test signal supplying to the filter circuit; and adjusting the phase shift amount of the synchronization signal by the phase adjustment circuit based on the comparison.

42. A phase shift amount adjustment method of adjusting a phase shift amount for an optical disc apparatus including an optical pickup illuminating light to an information recording medium having an information track wobbled at a constant period, receiving light reflected from the information recording medium and generating a light receiver signal corresponding to an amount of the received light, a first filter circuit removing noise from a wobble signal based on wobbling of the information track from the light receiver signal, a second filter circuit extracting a frequency component around a fundamental frequency component of the wobble signal based on the wobbling of the information track from the light receiver signal, a multiplier multiplying an output signal from the first filter circuit by an output signal from the second filter circuit, a phase adjustment circuit adjusting a phase difference of the two signals supplied to the multiplier, and an information detection circuit detecting information included in the wobble signal based on an output signal from the multiplier, the method comprising steps of:

supplying a test signal having the same frequency as a fundamental frequency component of the wobble signal extracted at information recording time to the first filter circuit and the second filter circuit;

acquiring a phase difference between a test signal outgoing from the first filter circuit and a test signal outgoing from the second filter circuit; and adjusting the phase difference between the two signals supplied to the multiplier by the phase adjustment circuit based on the phase difference acquired at the phase difference acquisition step.

43. The phase shift amount adjustment method as claimed in claim 42, wherein the phase difference acquisition step comprises:

a first phase difference acquisition step of acquiring a phase difference between a test signal outgoing from the first filter circuit and a test signal supplied to the first filter circuit; and a second phase difference acquisition step of acquiring a phase difference between a test signal outgoing from the second filter circuit and a test signal supplied to the second filter circuit.

44. A phase shift amount adjustment apparatus for adjusting a phase shift amount for an optical disc apparatus including an optical pickup illuminating light to the information recording medium having an information track wobbled at a constant period, receiving light reflected from the information recording medium and generating a light receiver signal corresponding to an amount of the received light, a filter circuit removing noise from a wobble signal based on wobbling of the information track from the light receiver signal, a synchronization detector detecting a synchronization signal included in the wobble signal, an encoder determining a recording start timing based on the synchronization signal, and a phase adjustment circuit shifting a phase of the synchronization signal and supplying the resulting synchronization signal to the encoder, the apparatus comprising:

an input part supplying to the filter circuit a test signal having the same frequency as a fundamental frequency component of the wobble signal extracted at information recording time;

a comparison part comparing a phase difference between a test signal outgoing from the filter circuit and the test signal supplying to the filter circuit; and a phase shift amount adjustment part adjusting the phase shift amount of the synchronization signal by the phase adjustment circuit based on the comparison.

45. A phase shift amount adjustment apparatus for adjusting a phase shift amount for an optical disc apparatus including an optical pickup illuminating light to an information recording medium having an information track wobbled at a constant period, receiving light reflected from the information recording medium and generating a light receiver signal corresponding to an amount of the received light, a first filter circuit removing noise from a wobble signal based on wobbling of the information track from the light receiver signal, a second filter circuit extracting a frequency component around a fundamental frequency component of the wobble signal based on the wobbling of the information track from the light receiver signal, a multiplier multiplying an output signal from the first filter circuit by an output signal from the second filter circuit, a phase adjustment circuit adjusting a phase difference of the two signals supplied to the multiplier, and an information detection circuit detecting information included in the wobble signal based on an output signal from the multiplier, the apparatus comprising:

an input part supplying a test signal having the same frequency as a fundamental frequency component of the wobble signal extracted at information recording time to the first filter circuit and the second filter circuit;

a phase difference acquisition part acquiring a phase difference between a test signal outgoing from the first filter circuit and a test signal outgoing from the second filter circuit; and a phase difference adjustment part adjusting the phase difference between the two signals supplied to the multiplier by the phase adjustment circuit based on the phase difference acquired at the phase difference acquisition part.

46. The phase shift amount adjustment apparatus as claimed in claim 45, wherein the phase difference acquisition part comprises:

a first phase difference acquisition part acquiring a phase difference between a test signal outgoing from the first filter circuit and a test signal supplied to the first filter circuit; and a second phase difference acquisition part acquiring a phase difference between a test signal outgoing from the second filter circuit and a test signal supplied to the second filter circuit.

* * * * *